(12) United States Patent
Dubey et al.

(10) Patent No.: US 10,646,837 B2
(45) Date of Patent: *May 12, 2020

(54) METHOD FOR PRODUCING FIBER REINFORCED CEMENTITIOUS SLURRY USING A MULTI-STATE CONTINUOUS MIXER

(71) Applicant: UNITED STATES GYPSUM COMPANY, Chicago, IL (US)

(72) Inventors: Ashish Dubey, Grayslake, IL (US); Peter B. Groza, Antioch, IL (US); Christopher R. Nelson, Lindenhurst, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,551

(22) Filed: Mar. 22, 2019

(65) Prior Publication Data

US 2019/0217259 A1 Jul. 18, 2019

Related U.S. Application Data

(63) Continuation of application No. 15/663,104, filed on Jul. 28, 2017, now Pat. No. 10,272,399.

(Continued)

(51) Int. Cl.
*B28B 3/22* (2006.01)
*B01F 7/00* (2006.01)
(Continued)

(52) U.S. Cl.
CPC .......... *B01F 7/0065* (2013.01); *B01F 3/1221* (2013.01); *B01F 7/00041* (2013.01);
(Continued)

(58) Field of Classification Search
CPC ....................................................... B28B 3/224
(Continued)

(56) References Cited

U.S. PATENT DOCUMENTS 3,284,980 A 11/1966 Dinkel
3,354,031 A 11/1967 Kozacik
(Continued)

FOREIGN PATENT DOCUMENTS

CN 204093355 U 1/2015
DE 1007684 B 5/1957
(Continued)

OTHER PUBLICATIONS

USG Building Envelope Solutions, USG SECUROCK® Brand Glass-Mat Sheathing Regular and FIRECODE® X, USG Corporation, 2015.

(Continued)

*Primary Examiner* — David L Sorkin
(74) *Attorney, Agent, or Firm* — Vorys, Sater, Seymour and Pease LLP; Pradip Sahu; Philip T. Petti

(57) ABSTRACT

A method in which a stream of dry cementitious powder from a dry powder feeder passes through a dry cementitious powder inlet conduit to feed a first feed section of a fiber-slurry mixer. An aqueous medium stream passes through at least one aqueous medium stream conduit to feed a first mixing section the fiber-slurry mixer. A stream of reinforcing fibers passes from a fiber feeder through a reinforcing fibers stream conduit to feed a second mixing section of the fiber-slurry mixer. The stream of dry cementitious powder, aqueous medium stream, and stream of reinforcing fibers combine in the fiber-slurry mixer to make a stream of fiber-cement mixture which discharges through a discharge conduit at a downstream end of the mixer.

20 Claims, 21 Drawing Sheets

Related U.S. Application Data

(60) Provisional application No. 62/371,590, filed on Aug. 5, 2016.

(51) Int. Cl.

| | | |
|---|---|---|
| *B28B 1/52* | (2006.01) | |
| *B28B 5/02* | (2006.01) | |
| *B28C 5/12* | (2006.01) | |
| *B28C 5/14* | (2006.01) | |
| *B28C 5/40* | (2006.01) | |
| *B29B 7/48* | (2006.01) | |
| *B29C 48/67* | (2019.01) | |
| *B29C 48/00* | (2019.01) | |
| *B29B 7/42* | (2006.01) | |
| *B29C 48/40* | (2019.01) | |
| *B29C 48/57* | (2019.01) | |
| *B01F 3/12* | (2006.01) | |
| *B01F 7/04* | (2006.01) | |
| *B01F 7/06* | (2006.01) | |
| *B01F 7/08* | (2006.01) | |
| *B01F 13/10* | (2006.01) | |
| *B01F 15/02* | (2006.01) | |

(52) U.S. Cl.
CPC ...... *B01F 7/00058* (2013.01); *B01F 7/00341* (2013.01); *B01F 7/00416* (2013.01); *B01F 7/00633* (2013.01); *B01F 7/00708* (2013.01); *B01F 7/042* (2013.01); *B01F 7/06* (2013.01); *B01F 7/083* (2013.01); *B01F 7/085* (2013.01); *B01F 13/1027* (2013.01); *B01F 15/0251* (2013.01); *B28B 1/526* (2013.01); *B28B 3/224* (2013.01); *B28B 5/027* (2013.01); *B28C 5/1238* (2013.01); *B28C 5/1246* (2013.01); *B28C 5/1276* (2013.01); *B28C 5/143* (2013.01); *B28C 5/146* (2013.01); *B28C 5/148* (2013.01); *B28C 5/402* (2013.01); *B29B 7/421* (2013.01); *B29B 7/429* (2013.01); *B29B 7/481* (2013.01); *B29B 7/482* (2013.01); *B29B 7/483* (2013.01); *B29B 7/485* (2013.01); *B29B 7/489* (2013.01); *B29C 48/022* (2019.02); *B29C 48/402* (2019.02); *B29C 48/57* (2019.02); *B29C 48/67* (2019.02); *B01F 2015/0221* (2013.01); *B01F 2215/0047* (2013.01)

(58) Field of Classification Search
USPC .................................................... 366/6, 8
See application file for complete search history.

(56) References Cited

U.S. PATENT DOCUMENTS

| | | |
|---|---|---|
| 3,785,621 A | 1/1974 | Hoskins |
| 3,885,774 A | 5/1975 | Harris et al. |
| 3,972,972 A | 8/1976 | Yano et al. |
| 4,093,471 A | 6/1978 | Greig |
| 4,187,275 A | 2/1980 | Bracalielly et al. |
| 4,205,919 A | 6/1980 | Attwell |
| 4,298,413 A | 11/1981 | Teare |
| 4,450,022 A | 5/1984 | Galer |
| 4,504,533 A | 3/1985 | Altenhofer et al. |
| 4,793,892 A | 12/1988 | Miller et al. |
| 5,018,673 A | 5/1991 | Eirich et al. |
| 5,051,221 A | 9/1991 | Bold |
| 5,221,386 A | 6/1993 | Ensminger et al. |
| 5,249,547 A | 10/1993 | Takada et al. |
| 5,306,452 A | 4/1994 | Todd |
| 5,366,676 A | 11/1994 | Kobayashi |
| 5,520,779 A | 5/1996 | Bold |
| 5,891,374 A | 4/1999 | Shah et al. |
| 5,902,528 A | 5/1999 | Spragg |
| 6,001,496 A | 12/1999 | O'Haver-Smith |
| 6,248,156 B1 | 6/2001 | Lucas |
| 6,248,214 B1 | 6/2001 | Stotz et al. |
| 6,299,970 B1 | 10/2001 | Richards et al. |
| 6,620,487 B1 | 9/2003 | Tonyan et al. |
| 6,986,812 B2 | 1/2006 | Dubey et al. |
| 7,049,251 B2 | 5/2006 | Porter |
| 7,347,895 B2 | 3/2008 | Dubey |
| 7,354,876 B2 | 4/2008 | Porter et al. |
| 7,384,514 B2 | 6/2008 | Walters et al. |
| 7,416,636 B2 | 8/2008 | Blomqvist et al. |
| 7,513,963 B2 | 4/2009 | Frank et al. |
| 7,524,386 B2 | 4/2009 | George et al. |
| 7,615,504 B2 | 11/2009 | Porter et al. |
| 7,670,520 B2 | 3/2010 | Dubey |
| 7,732,032 B2 | 6/2010 | Dubey |
| 7,754,052 B2 | 7/2010 | Frank et al. |
| 7,794,221 B2 | 9/2010 | Dubey |
| 7,842,629 B2 | 11/2010 | Jaffee |
| 7,845,130 B2 | 12/2010 | Tonyan et al. |
| 7,846,536 B2 | 12/2010 | Dubey |
| 7,870,698 B2 | 1/2011 | Tonyan et al. |
| 7,897,079 B2 | 3/2011 | Miller |
| 7,989,370 B2 | 8/2011 | Currier et al. |
| 3,030,377 A1 | 10/2011 | Dubey et al. |
| 3,038,915 A1 | 10/2011 | Stivender |
| 8,038,790 B1 | 10/2011 | Dubey et al. |
| 3,061,257 A1 | 11/2011 | Tonyan et al. |
| 8,057,915 B2 | 11/2011 | Song et al. |
| 8,061,108 B2 | 11/2011 | Tonyan et al. |
| 8,062,741 B2 | 11/2011 | Tonyan et al. |
| 8,065,853 B2 | 11/2011 | Tonyan et al. |
| 8,069,633 B2 | 12/2011 | Tonyan et al. |
| 8,128,767 B2 | 3/2012 | Jaffee |
| 8,137,490 B2 | 3/2012 | Frank et al. |
| 8,163,352 B2 | 4/2012 | Jones |
| 8,461,067 B2 | 6/2013 | Smith et al. |
| 8,568,544 B2 | 10/2013 | Engbrecht et al. |
| 8,727,254 B2 | 5/2014 | Lucas et al. |
| 8,770,139 B2 | 7/2014 | Frank et al. |
| 2003/0146539 A1 | 8/2003 | Chen et al. |
| 2004/0219845 A1 | 11/2004 | Graham et al. |
| 2005/0064164 A1 | 3/2005 | Dubey et al. |
| 2006/0061007 A1 | 3/2006 | Chen et al. |
| 2006/0144005 A1 | 7/2006 | Tonyan et al. |
| 2006/0168906 A1 | 8/2006 | Tonyan et al. |
| 2006/0174572 A1 | 8/2006 | Tonyan et al. |
| 2006/0185267 A1 | 8/2006 | Tonyan et al. |
| 2007/0148430 A1 | 6/2007 | Agrawal |
| 2007/0149083 A1 | 6/2007 | Agrawal |
| 2008/0099133 A1 | 5/2008 | Stivender |
| 2008/0308968 A1 | 12/2008 | Immordino, Jr. |
| 2009/0218720 A1 | 9/2009 | Chen et al. |
| 2010/0143682 A1 | 6/2010 | Shake et al. |
| 2010/0151757 A1 | 6/2010 | Herbert et al. |
| 2011/0186664 A1 | 8/2011 | Lucas et al. |
| 2012/0219747 A1 | 8/2012 | Kanao |
| 2012/0231233 A1 | 9/2012 | Kanao |
| 2013/0075051 A1 | 3/2013 | Thomisch et al. |
| 2013/0186989 A1 | 7/2013 | Lucas et al. |
| 2013/0337251 A1 | 12/2013 | Grassl |
| 2014/0231560 A1 | 8/2014 | Lucas et al. |
| 2014/0239105 A1 | 8/2014 | Lucas et al. |
| 2014/0272404 A1 | 9/2014 | Shake et al. |
| 2018/0036909 A1 | 2/2018 | Dubey et al. |
| 2018/0036911 A1 | 2/2018 | Dubey et al. |
| 2018/0036912 A1 | 2/2018 | Dubey et al. |

FOREIGN PATENT DOCUMENTS

| | | |
|---|---|---|
| DE | 2312436 A1 | 10/1973 |
| DE | 3309007 A1 | 9/1984 |
| DE | 10060328 C1 | 12/2001 |
| DE | 102008058222 A1 | 5/2010 |
| EP | 003705 A2 | 8/1979 |
| EP | 1653000 A1 | 5/2006 |
| GB | 1085592 A | 10/1967 |
| GB | 2048446 A | 12/1980 |
| GB | 2166660 A | 5/1986 |

(56) References Cited

FOREIGN PATENT DOCUMENTS

| | | |
|---|---|---|
| JP | H04189104 A | 7/1992 |
| JP | H08118330 A | 5/1996 |
| JP | 2763059 A | 6/1998 |
| JP | 4454715 B2 | 4/2010 |
| WO | 2009085981 A2 | 7/2009 |
| WO | 2009142791 A2 | 11/2009 |
| WO | 2009152615 A1 | 12/2009 |

OTHER PUBLICATIONS

Application of PID neural network in headbox multivariable decoupling control (only Abstract), IEEE, pp. 2427-2430, ISBN 978-1-4577-1414-6, 2012.

Tucker et al., Production of Glass Fibers for Reinforcement of Lunar Concrete, Conference: 44th AIAA Aerospace Sciences Meeting and Exhibit, Jan. 2006), DOI: 10.2514/6.2006-523, URL: <https://www.researchgate.net/publication/268564326_Production_of_Glass_Fibers_for_Reinforcement_of_Lunar_Concrete>, Retrieved from the Internet Jun. 22, 2017.

O'Connell, Development of a New High Performance Synthetic Fiber for Concrete Reinforcement, Master's Thesis, Dalhousie University, Jul. 5, 2011.

Technical Guidelines, Pictorial Atlas of Concrete Repair Equipment, International Concrete Repair Institute, (ICRI) Guideline No. 320.5R-2014, May 2014.

Naaman, Engineered Steel Fibers with Optimal Properties for Reinforcement of Cement Composites, Journal of Advanced Concrete Technology vol. 1, No. 3, 241-252, Nov. 2003, Japan Concrete Institute.

Bentur et al., Fibre Reinforced Cementitious Composites, Modern Concrete Technology Series, Taylor & Francis Group, 2007.

Martin Christopher Tr-b, Numerical Modeling of High Performance Fiber Reinforced Cementitious Composites, ETH No. 19437, ETH Zurich, 2011.

Pan Mixers, Pan Mixers from Steelfields, URL: <http://steelfields.com/mixers/pan-mixers/>, Retrieved from the Internet Jun. 21, 2016.

Paddle Mixers, Paddle Mixers from Steelfields, URL:<http://steelfields.com/mixers/paddle-mixers/>, Retrieved from Internet Jun. 21, 2016.

Majumdar et al, Glass fibre reinforced cement, Material Science and Engineering, vol. 15, Issue 2-3, Aug.-Sep. 1974, pp. 107-127 (Abstract only), URL : < http://www.sciencedirect.com/science/article/pii/0025541674900433> , retrieved from the Internet Jun. 22, 2016.

International Search Report and Written Opinion dated Nov. 14, 2017 for PCT/US2017/0045426 to United States Gypsum Company filed Aug. 4, 2017.

FIG. 4B
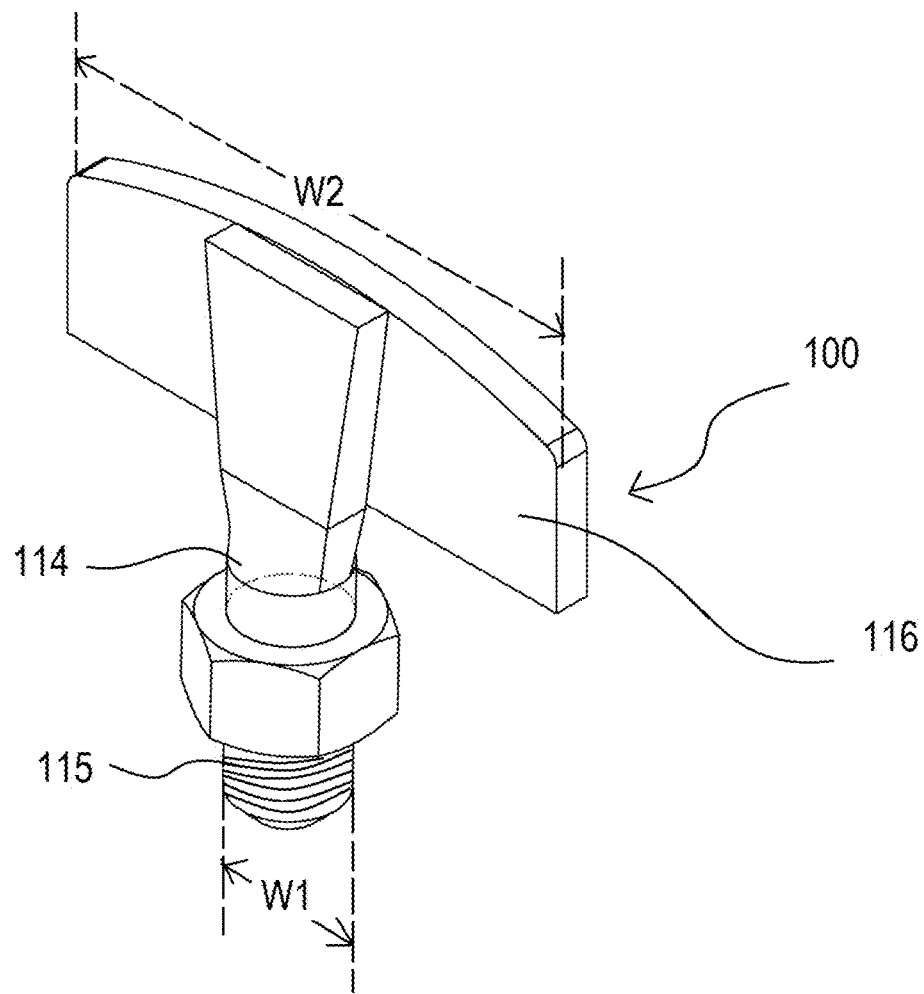
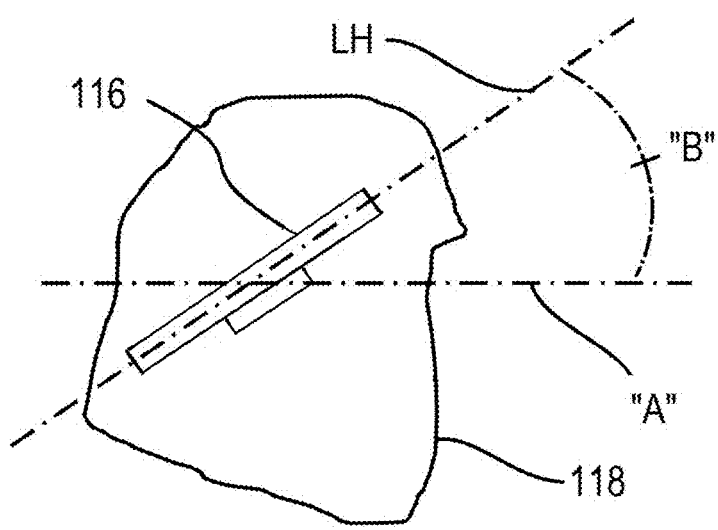
FIG. 4C

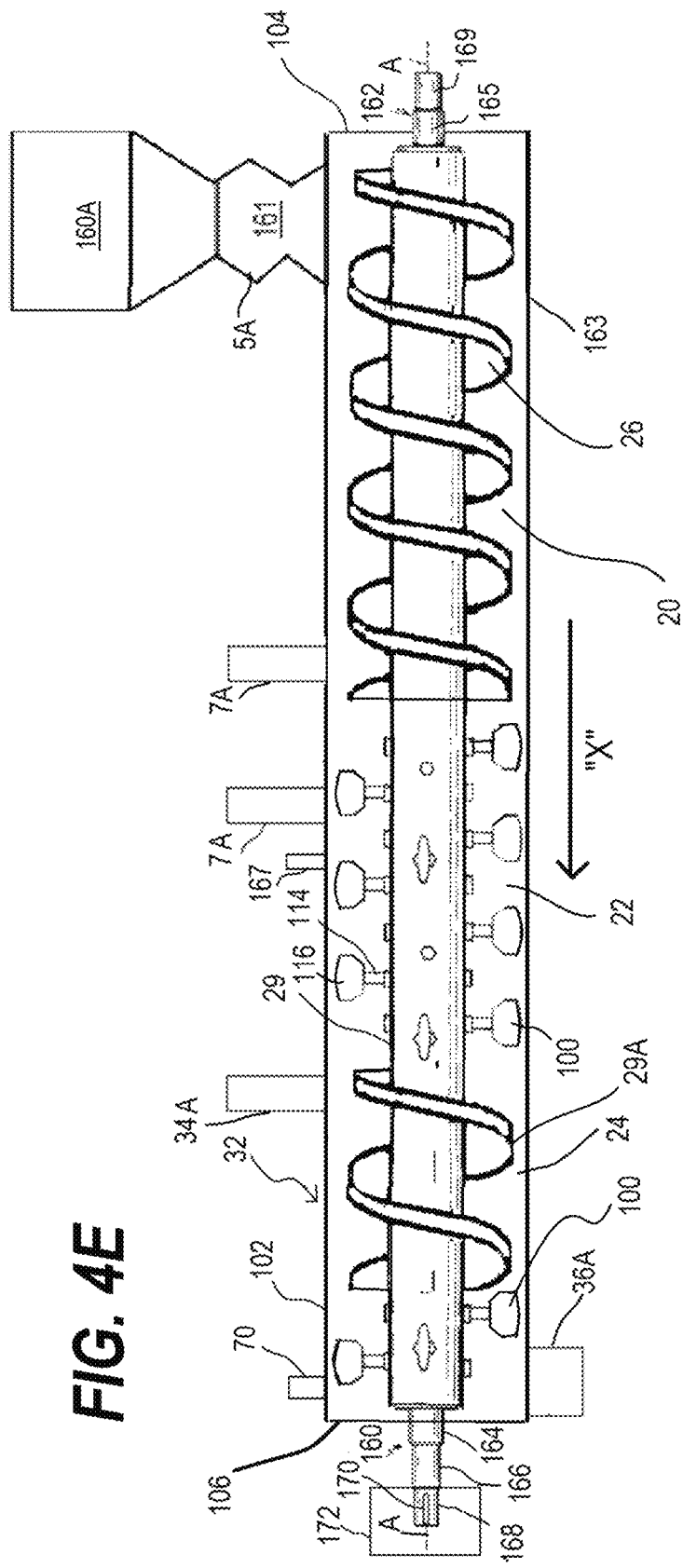

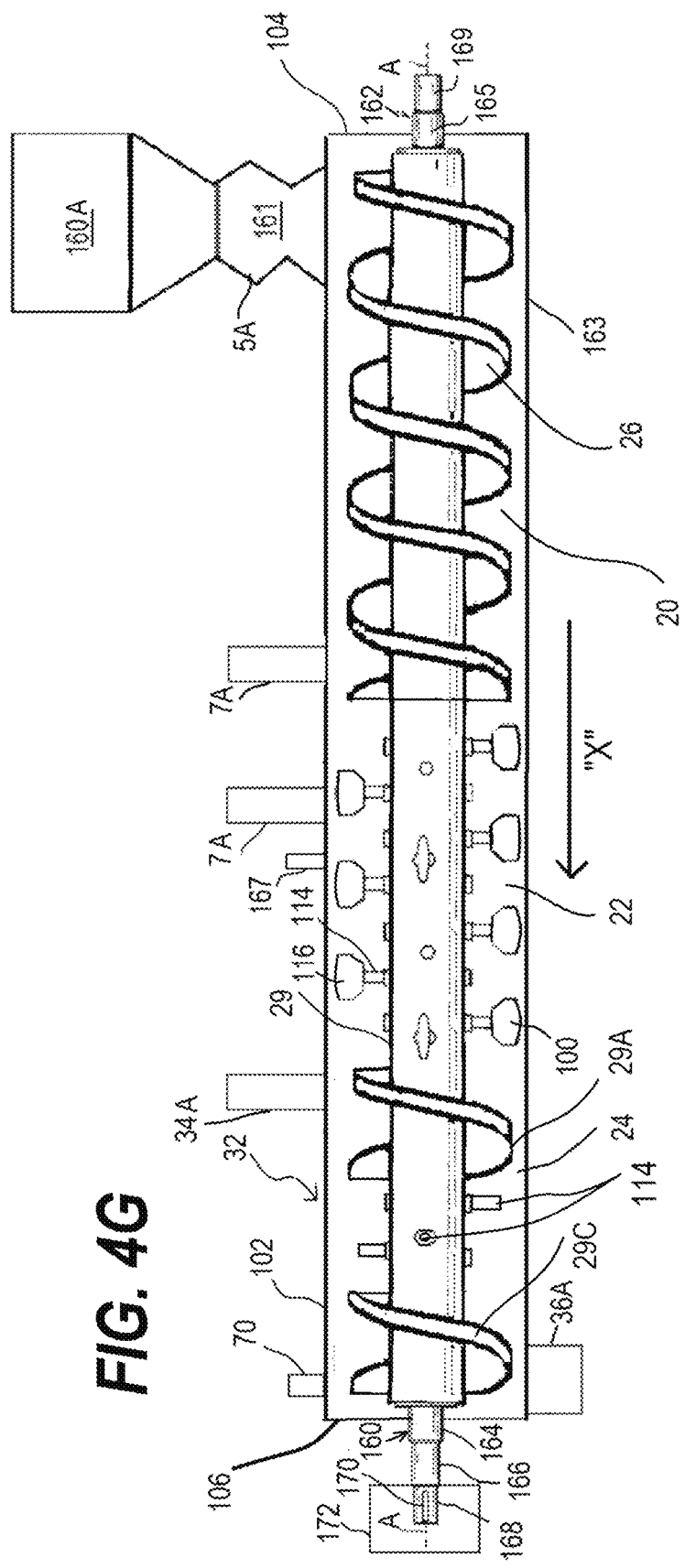

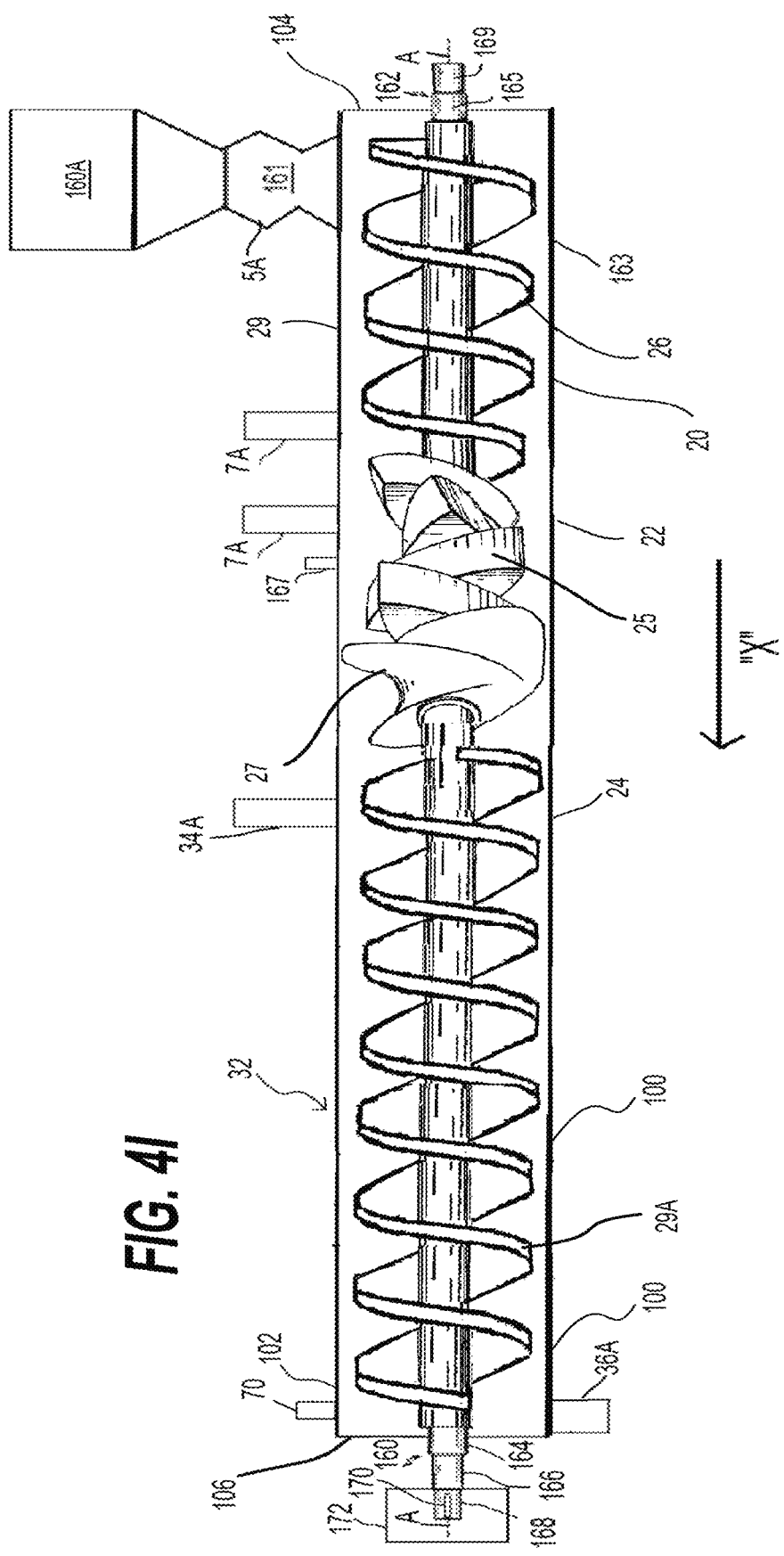

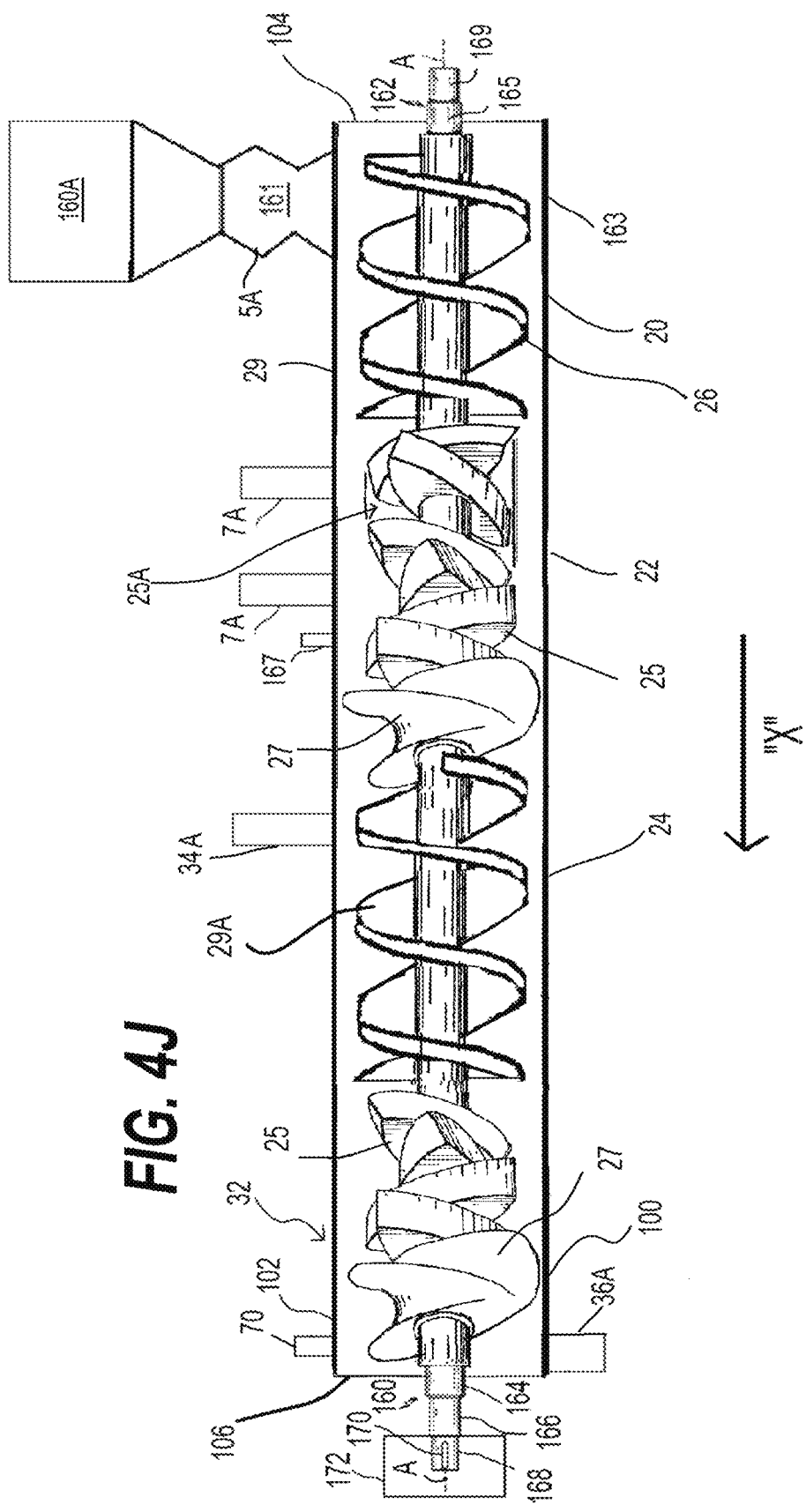

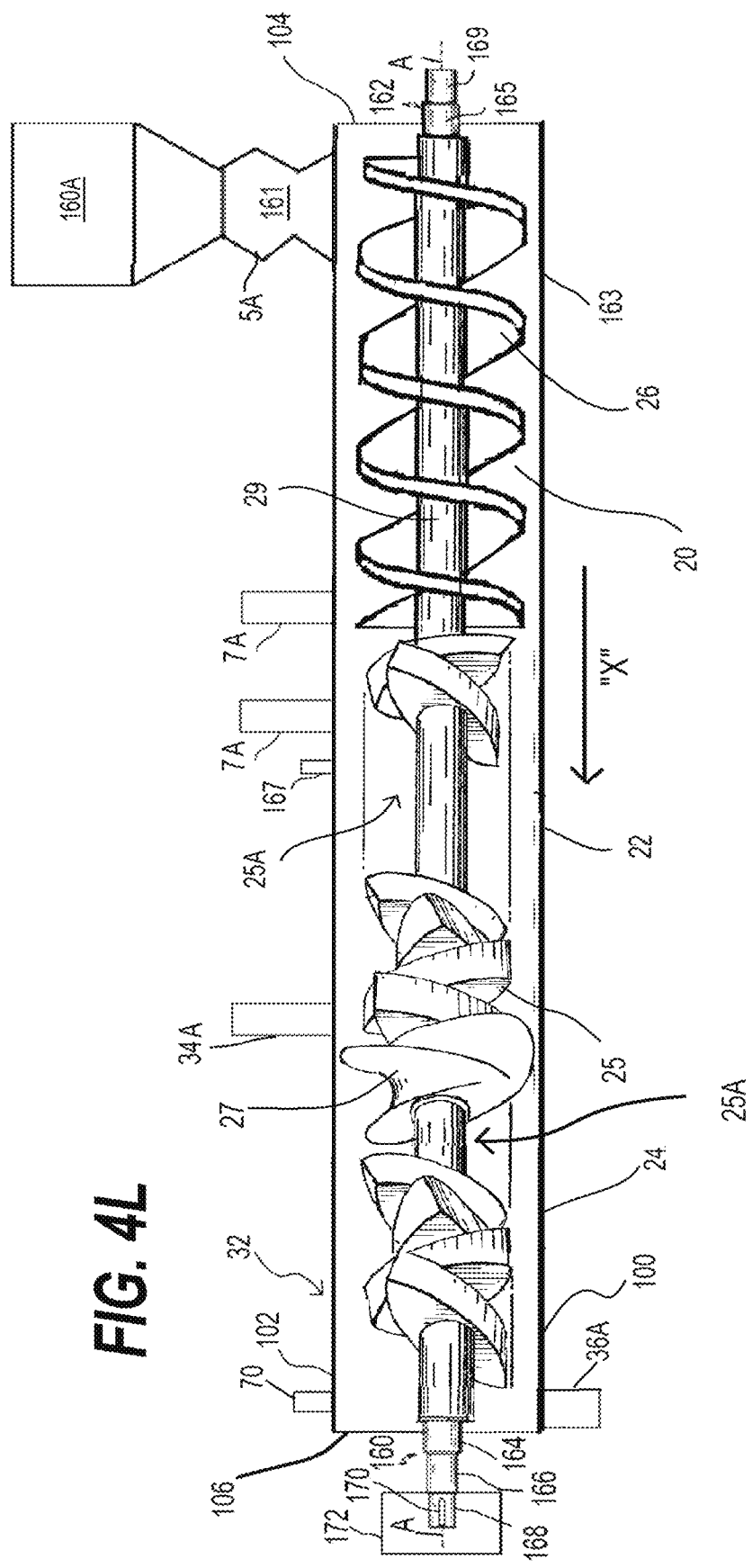

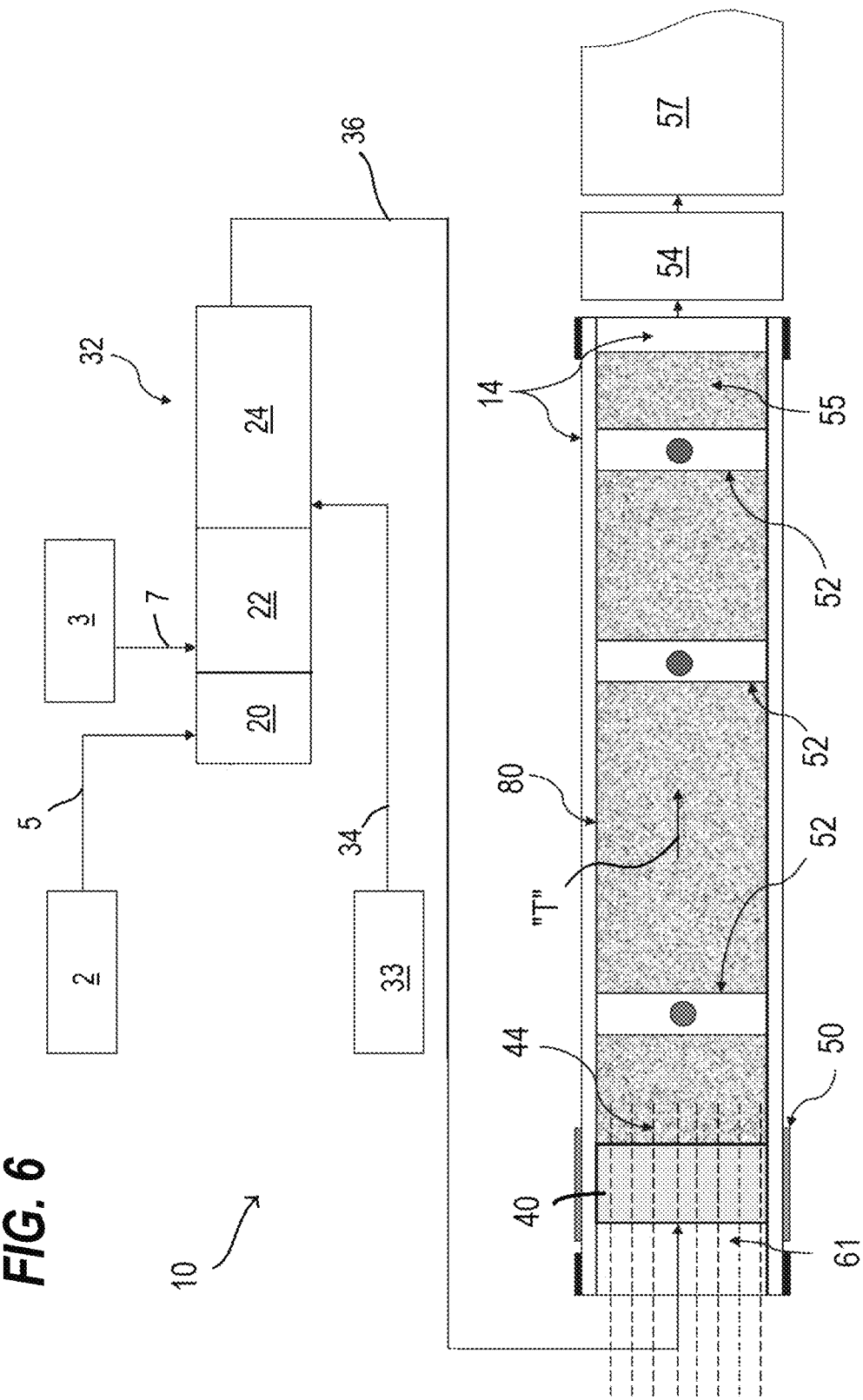

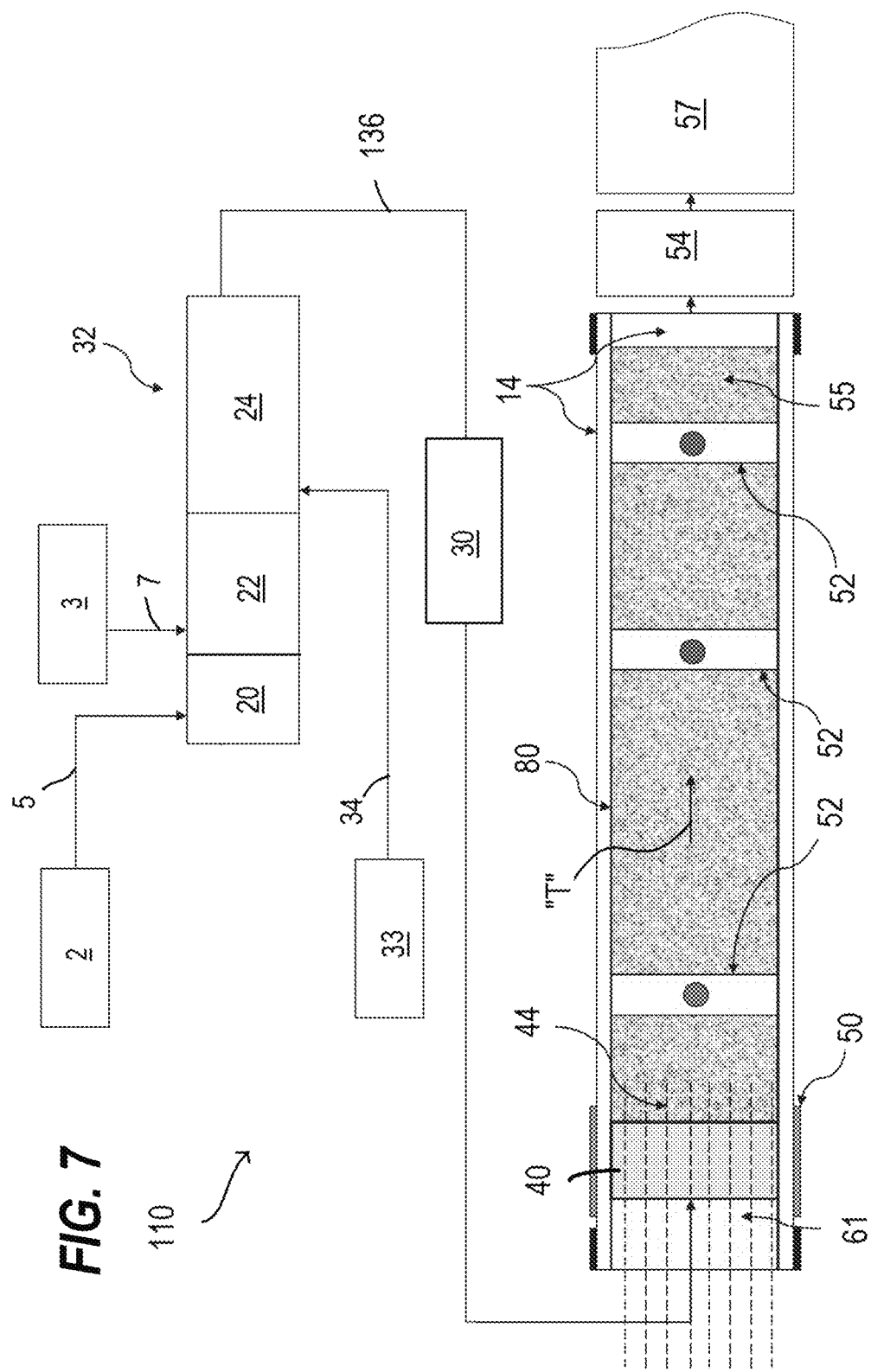

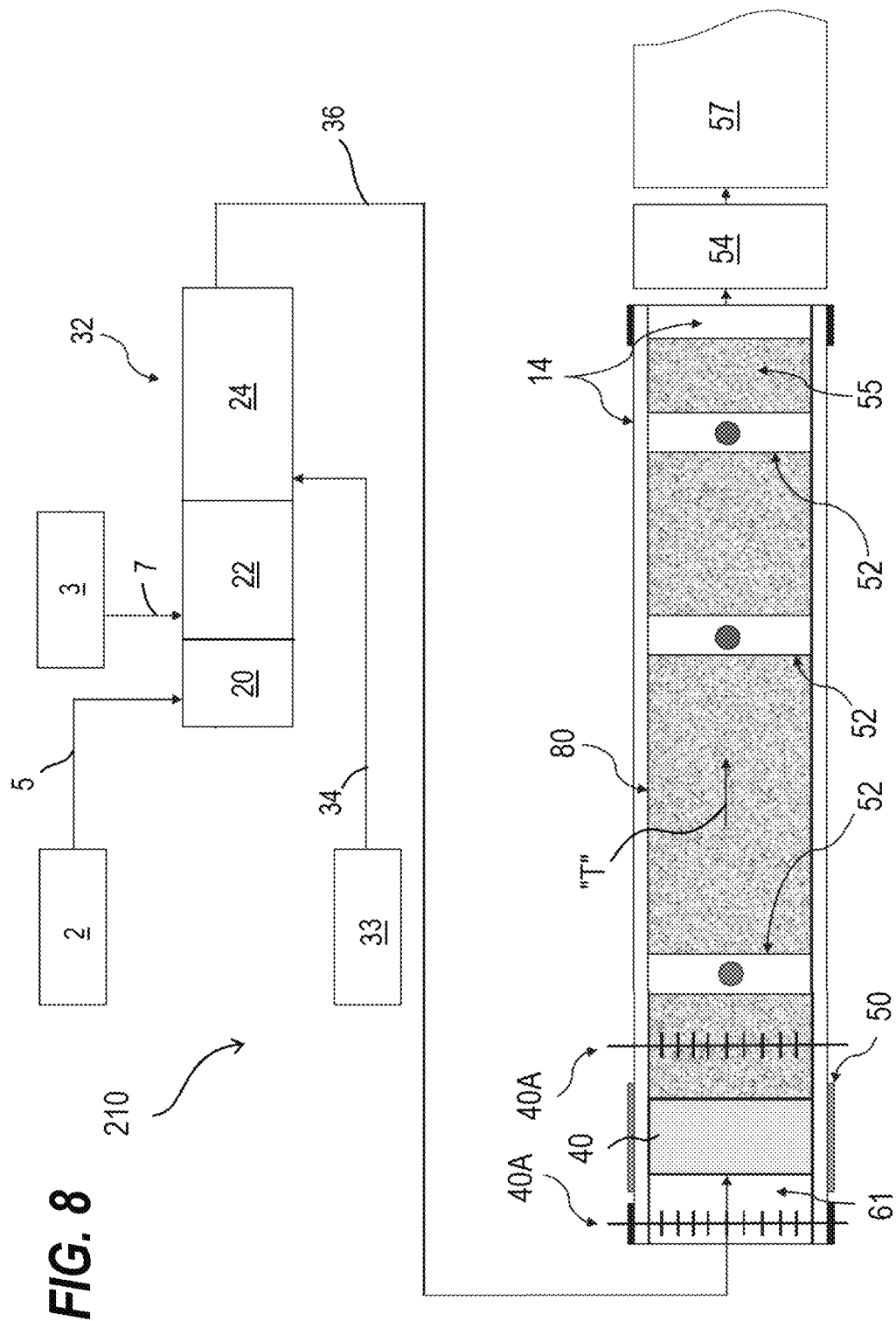

METHOD FOR PRODUCING FIBER REINFORCED CEMENTITIOUS SLURRY USING A MULTI-STATE CONTINUOUS MIXER

CROSS REFERENCE TO RELATED APPLICATIONS

This application is related to:

U.S. Provisional Patent Application No. 62/371,554 filed Aug. 5, 2016, entitled CONTINUOUS METHODS OF MAKING FIBER REINFORCED CONCRETE PANELS, filed Aug. 5, 2016;

U.S. Provisional Patent Application No. 62/371,569 filed Aug. 5, 2016, entitled HEADBOX AND FORMING STATION FOR FIBER REINFORCED CEMENTITIOUS PANEL PRODUCTION, filed Aug. 5, 2016;

U.S. Provisional Patent Application No. 62/371,578 filed Aug. 5, 2016, entitled CONTINUOUS MIXER AND METHOD OF MIXING REINFORCING FIBERS WITH CEMENTITIOUS MATERIALS, filed Aug. 5, 2016;

all herein incorporated by reference in their entirety.

This application is a continuation of U.S. patent application Ser. No. 15/663,104, filed Jul. 28, 2017 which claims the benefit of U.S. Provisional Patent Application No. 62/371,590 entitled A METHOD FOR PRODUCING FIBER REINFORCED CEMENTITIOUS SLURRY USING A MULTI-STAGE CONTINUOUS MIXER, filed Aug. 5, 2016 incorporated by reference in its entirety.

FIELD OF THE INVENTION

This invention discloses a continuous mixer and a method of mixing reinforcing fibers with cementitious materials for producing fiber reinforced cementitious materials, namely (fiber reinforced concrete (FRC) panel), in a continuous process.

BACKGROUND OF THE INVENTION

U.S. Pat. No. 6,986,812 of Dubey et al., incorporated herein by reference in its entirety, features a slurry feed apparatus for use in a SCP panel production line or the like application where settable slurries are used in the production of building panels or board. The apparatus includes a main metering roll and a companion roll placed in close, generally parallel relationship to each other to form a nip in which a supply of slurry is retained. Both rolls preferably rotate in the same direction so that slurry is drawn from the nip over the metering roll to be deposited upon a moving web of the SCP panel production line. A thickness control roll is provided in close operational proximity to the main metering roll for maintaining a desired thickness of the slurry.

U.S. Pat. No. 7,524,386 B2 to George et al, incorporated herein by reference in its entirety, discloses a process employing a wet mixer having a vertical mixing chamber for forming a wet slurry of a cementitious powder and liquid. The vertical mixing chamber is designed to provide the required amount of mixing to provide thoroughly mixed, uniformly thin slurry within a mixing residence time that allows for adequate supply of slurry to ensure continuous operation of an associated cement panel production line. Gravity feed means for supply of cementitious powder and water to the slurry mixing area of the chamber is also disclosed. In preparing the SCP panels, an important step is mixing cementitious powder to form slurry. The slurry is then withdrawn from the bottom of the chamber and pumped through a cavity pump to the slurry feeding apparatus. A typical conventional continuous cement mixer is the DUO MIX2000 continuous cement mixer from M-TEC GmbH, Neuenburg, Germany which is used in the construction industry to mix and pump concrete slurry.

U.S. Pat. No. 7,513,963 B2 to George et al, incorporated herein by reference in its entirety, discloses a wet mixer apparatus and method for its use, the mixer having a vertical mixing chamber for forming a wet slurry of a cementitious slurry and water. The vertical mixing chamber is designed to provide the required amount of mixing to provide thoroughly mixed, uniformly thin slurry within a mixing residence time that allows for adequate supply of slurry to ensure continuous operation of an associated cement panel production line. Gravity feeding for separate supply of cementitious powder and water to the slurry mixing area of the chamber without pre-mixing of the powder and water is also disclosed.

U.S. Pat. No. 8,038,790 to Dubey et al., incorporated herein by reference in its entirety, discloses structural cement panel for resisting transverse and shear loads equal to transverse and shear loads provided by plywood and oriented strain board, when fastened to framing for use in shear walls, flooring and roofing systems. The panels provide reduced thermal transmission compared to other structural cement panels. The panels employ one or more layers of a continuous phase resulting from curing an aqueous mixture of calcium sulfate alpha hemihydrate, hydraulic cement, coated expanded perlite particles filler, optional additional fillers, active pozzolan and lime. The coated perlite has a particle size of 1-500 microns, a median diameter of 20-150 microns, and an effective particle density (specific gravity) of less than 0.50 g/cc. The panels are reinforced with fibers, for example alkali-resistant glass fibers.

US Patent Application Publication No. 2005/0064164 to Dubey et al., incorporated herein by reference in its entirety, discloses a multi-layer process for producing structural cementitious panel which includes: (a.) providing a moving web; (b.) one of (i) depositing a first layer of individual, loose fibers upon the web, followed by depositing a layer of settable slurry upon the web and (ii) depositing a layer of settable slurry upon the web; (c.) depositing a second layer of individual, loose fibers upon the slurry; (d.) actively embedding said second layer of individual, loose fibers into the slurry to distribute said fibers throughout the slurry; and (e.) repeating steps (ii) through (d.) until the desired number of layers of settable fiber-enhanced slurry is obtained and so that the fibers are distributed throughout the panel. Also provided are a structural panel produced by the process, an apparatus suitable for producing structural cementitious panels according to the process, and a structural cementitious panel having multiple layers, each layer created by depositing a layer of settable slurry upon a moving web, depositing fibers upon the slurry and embedding the fibers into the slurry such that each layer is integrally formed with the adjacent layers.

US Patent Application Publication No. 2006/0061007 to Chen discloses a method and apparatus for extruding cementitious articles. The extruder includes a casing with a pair of inter-meshing self-wiping screws rotatably mounted therein. The screws continuously mix and knead the components of the fiber cement provided through various feed means to form a substantially homogeneous paste and force the paste through a die to form a green cementitious extrudate suitable for casting. Cementitious mixtures for extruding are very viscous and not suitable for uses such as shotcrete or deposition through a headbox on a cementitious panel production line.

The current state-of-the-art mixing technology for producing fiber reinforced cementitious slurry typically involves use of industry standard batch mixers into which all raw materials including reinforcing fibers are first added and then mixed for several minutes to yield a slurry mixture with randomly dispersed fibers. Rotating drum and rotating pan mixers are examples of concrete mixers that are commonly used for preparing fiber reinforced cementitious slurry mixtures. Some major limitations and drawbacks of the current state-of-the art concrete mixers and mixing technologies for producing fiber reinforced cementitious slurry mixtures include:

The mixing operation in a batch mixer is not continuous thus making their use more difficult in applications where a continuous supply of slurry is needed such as in the case of a continuous panel production line.

The mixing time in a batch mixer is typically very long, in the order of several minutes, to obtain a well-blended, homogeneous slurry mixture.

Since a large amount of fibers are added at a time in a batch mixer, that leads to fiber lumping and balling during the mixing operation.

Longer mixing times involved with the batch mixing process tend to damage and break the reinforcing fibers.

Batch mixers are not very useful and practical with respect to handling rapid setting cementitious materials.

There is a need for a single-layer process for producing slurry for cementitious panels having high reinforcing fiber concentrations. Thus, there is a need for an improved wet mixing apparatus that ensures supply of sufficient mixed fluid cementitious slurry which contains glass fibers to supply a continuous panel production line. It is desired to provide a degree of mixing of the cementitious reactive powder, glass fibers, and water in the mixer to result in a slurry of proper rheology and sufficient fluidity to provide a slurry for use in the continuous cementitious panel manufacturing line.

SUMMARY OF THE INVENTION

The present invention uses a wet mixer apparatus for preparing slurry to be fed to a slurry feed apparatus (typically known as a "headbox") for use in depositing slurry on a moving web of a cementitious panel production line or the like where settable slurries are used for producing fiber reinforced building panels or boards.

Considering the limitations and drawbacks of the current state-of-the-art concrete mixers, some objectives of the present invention are as follows:

Provide a mixer that allows continuous blending of fibers with the rest of the cementitious components to produce a uniformly mixed fiber reinforced cementitious slurry mixture.

Provide a mixer that reduces the required mixing time from several minutes to less than 60 seconds, preferably less than 30 seconds, to produce a uniformly blended fiber reinforced cementitious slurry mixture.

Provide a mixer that does not cause fiber balling and lumping during the mixing operation.

Provide a mixer that does not cause damage to the reinforcing fibers as a result of the mixing action.

The invention provides a method for preparing cement composite slurry which can be supplied in a continuous manner comprising the steps of:

feeding a dry cementitious powder into a horizontal continuous mixer through at least one dry cementitious powder inlet port;

the horizontal continuous mixer comprising
an elongated mixing chamber, the elongated mixing chamber defined by a horizontal (typically cylindrical) housing having an interior side wall, the elongated mixing chamber having an upstream end feed section, a first mixing section, and a second downstream end mixing section, wherein the first mixing section is between the upstream end feed section and the second downstream end mixing section,
at least a pair of horizontally oriented intermeshing self-wiping impellers traversing from an upstream end of the elongated mixing chamber to a downstream end of the elongated mixing chamber and rotating within the elongated mixing chamber, wherein each horizontally mounted impeller within the upstream end feed section of the elongated mixing chamber comprises an auger, wherein the dry cementitious powder is fed into the upstream end feed section of the elongated mixing chamber and conveyed by the auger to the first mixing section, feeding a liquid stream comprising water into the elongated mixing chamber of the continuous slurry mixer through at least one liquid stream inlet port downstream of the at least one dry cementitious powder inlet port and mixing the dry cementitious powder and the liquid stream in the first mixing section to form a cementitious slurry;

wherein each horizontally mounted impeller within the first mixing section comprises a first plurality of mixing paddles mounted on a horizontally oriented shaft of the impeller at regular intervals and different circumferential locations, the paddles rotated about the horizontally oriented shaft within the horizontal, preferably cylindrical housing, the paddles extending radially from the shaft, feeding a stream of reinforcement fibers through at least one reinforcement fiber inlet port into the second mixing section, and mixing the cementitious slurry and the reinforcement fibers in the second mixing section to form a fiber-slurry mixture, wherein at least a portion of each horizontally mounted impeller within the second mixing section of the elongated mixing chamber comprises at least one member selected from the group consisting of:

an auger, and a second plurality of mixing paddles mounted on the horizontally oriented shaft of the mixer at regular intervals and different circumferential locations, the paddles rotated about each respective horizontally oriented shaft within the horizontal (preferably cylindrical) housing, the paddles extending radially from the respective shaft, discharging the fiber-slurry mixture from the mixer through a fiber-slurry mixture outlet port at a downstream end portion of the second mixing section, wherein the cementitious slurry and fibers are mixed in the mixing chamber of the horizontal continuous mixer for an average mixing residence time of about 5 to about 240 seconds, preferably 10 to 180 seconds, more preferably 10 to 120 seconds, most preferably 10 to 60 seconds, while the rotating paddles apply shear force, wherein the central rotating shaft rotates at 30 to 450 RPM, more preferably 40 to 300 RPM, and most preferably 50 to 250 RPM during mixing, to the fiber-slurry mixture to produce a uniform fiber-slurry mixture, wherein the fiber-slurry mixtures discharged from the horizontal continuous mixer have a slump of 4 to 11 inches as measured according to a slump test using a 4 inch tall and 2 inch diameter pipe.

The resulting fiber-slurry mixtures also have a viscosity less than 45000 centipoise, preferably less than 30000 centipoise, more preferably less than 15000 centipoise, and most preferably less than 10000 centipoise when measured using a Brookfield Viscometer, Model DV-II+ Pro with Spindle HA4 attachment running at 20 RPM speed. Typically the resulting fiber-slurry mixtures have a viscosity of at least 1500 centipoise. The fiber-slurry mixtures typically also include plasticizers and superplasticizers. Plasticizers are commonly manufactured from lignosulfonates, a by-product from the paper industry. Superplasticizers have generally been manufactured from sulfonated naphthalene condensate or sulfonated melamine formaldehyde, or based on polycarboxylic ethers.

The term paddles means any structure extending radially from the shaft for rotating about the shaft. Paddles may have any of a variety of shapes. For example, preferred paddles are flat paddles, helical paddles, or paddles made of a pin having opposed ends, one end for attaching to the shaft and the other end for attachment to a broad paddle head. The pins used without the paddle head are also considered paddles within the scope of the invention.

The present fiber-slurry mixtures preferably lack thickeners or other additives that substantially increase material viscosity.

Each horizontally oriented shaft is externally connected to a drive mechanism and a drive motor, for example, powered by electricity, fuel gas, gasoline, or other hydrocarbon, to accomplish shaft rotation when the mixer is in operation.

The fiber-slurry mixtures discharged from the fiber-slurry mixer are suitable for a variety of uses, for example statuary, shotcrete, consolidation of loose rock on slopes, soil stabilization, tunnel and mine linings, pre-cast concrete products, pavements and bridge decks, concrete slab-on-grade, repair applications, or to make a fiber reinforced cement building panel or board.

When using the settable fiber-slurry mixture for producing fiber reinforced cement panel (also known as a fiber reinforced concrete panel, abbreviated FRC panel) the fiber-slurry mixture is fed to a slurry feed apparatus (known as a "headbox") which deposits the fiber-slurry mixture on a moving surface of a panel production line uniformly as a layer 0.125 to 2 inches thick, preferably 0.25 to 1 inches thick, typically 0.40 to 0.75 inches thick to produce the fiber reinforced concrete panel. The process for producing cementitious panels from fiber-slurry mixtures of the present invention produces panels having at most a single layer of fiber reinforced cementitious slurry. Preferably the moving surface moves at a speed of 1 to 100 feet per minute, more preferably 5 to 50 feet per minute. This is substantially faster than conventional extrusion processes well known in the art. Preferably the slurry is deposited on the moving surface at a rate of 0.10 to 25 cubic feet per minute for a board ranging from 4 to 8 feet wide. The manufacturing process of this invention is also substantially faster than conventional extrusion processes that utilize cementitious mixtures having extremely high viscosities.

The resulting fiber-slurry mixtures of the present invention distinguish over cementitious mixtures used in extrusion processes. Such extrusion mixtures have a slump of 0 to 2 inches as measured according to the slump test using a 4 inch tall and 2 inch diameter pipe and have a viscosity greater than 50000 centipoise. The extrusion mixtures also do not include plasticizers and superplasticizers which are present in fiber-slurry mixtures of the present invention. As mentioned above plasticizers are commonly manufactured from lignosulfonates, a by-product from the paper industry. Superplasticizers have generally been manufactured from sulfonated naphthalene condensate or sulfonated melamine formaldehyde, or based on polycarboxylic ethers.

A distinctive feature of the mixer and mixing method of the present invention disclosed herein is the ability of this mixer to blend reinforcing fibers with the rest of the cementitious components in a continuous operation without unduly damaging the added fibers. Furthermore, the mixer and mixing method of this invention allow production of a fiber reinforced cementitious slurry mixture having a desirable working consistency. The slurries with favorable rheological properties produced by this mixer can beneficially be utilized for producing products using a variety of manufacturing processes. For instance, a workable slurry consistency facilitates further processing and formation of panel products on a continuous forming line running at high line speeds.

Preferably, the paddles of the mixer comprise both members of the group consisting of:
  the paddles of the first plurality of mixing and conveying paddles which each comprise a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged for mixing the dry cementitious powder and the liquid stream to form a cementitious slurry and move the cementitious slurry to the second mixing section, and
  the paddles of the second plurality of mixing and conveying paddles which each comprise a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged to mix the reinforcement fibers and cementitious slurry and move the cementitious slurry and reinforcement fibers being mixed to the fiber-slurry mixer outlet.

Preferably the mixing chamber of the horizontal mixer is adapted and configured to mix the cementitious slurry and fibers in the mixing chamber of the horizontal mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to the fiber-slurry mixture to produce a uniform fiber-slurry mixture as described above that has a consistency to allow the fiber-slurry mixture to be discharged from the fiber-slurry mixer.

The mixer of the present invention may be employed as part of an apparatus for producing a cementitious panel having at most a single layer of fiber reinforced cementitious composition which includes a conveyor-type frame supporting a moving web; a first water and cementitious material mixer in operational relationship to the frame and configured for feeding the cementitious slurry into the fiber-slurry mixer; a first slurry feed station (headbox) in operational relationship to the frame and configured for depositing a layer of settable fiber-containing cementitious slurry upon the moving web. Downstream is an apparatus for cutting the set slurry into cement boards.

The method disclosed herein is a continuous method as opposed to a batch method. In a continuous method the raw materials required to make the end product are metered and fed continuously at a rate that equals the rate (mass balance) at which the end product is being produced, that is, the raw material feed flows in the process and the end product flows out of the process simultaneously. In a batch method, the raw materials required to make the end product are first combined in large amounts to prepare a large batch of mixture for storage in appropriate vessel/s; this batch of mixture is then subsequently drawn from the storage vessel/s to produce multiple pieces of the end product.

In this specification all composition percentages are in weight percent unless otherwise indicated.

BRIEF DESCRIPTION OF THE DRAWINGS

FIG. 4B shows a perspective view of a paddle (with a pin and a head) of the horizontal fiber-slurry mixer embodiment of the present fiber-slurry mixing device of FIG. 4A.

FIG. 4C shows a top view of a paddle (with a pin and a head) and a portion of the shaft of the horizontal continuous fiber-slurry mixer embodiment of the present fiber-slurry mixing device of FIG. 4A.

FIG. 4E shows a configuration (schematically shown in FIG. 3B) of a dual-shaft (one shaft shown) multi-stage continuous fiber-slurry mixer in which the first mixing section has paddles and the second mixing section has augers followed by paddles on both shafts.

FIG. 4G shows a configuration (schematically shown in FIG. 3B) of a dual-shaft (one shaft shown) multi-stage continuous fiber-slurry mixer in which the first mixing section has paddles and the second mixing section has an auger followed by pin/s followed by an auger on both shafts.

FIG. 4I shows a configuration (schematically shown in FIG. 3A) having a dual-shaft (one shaft shown) multi-stage continuous fiber-slurry mixer of the present invention in which the first mixing section has paddles and the second mixing section has augers on both shafts), wherein the paddles are flat paddles or helical paddles.

FIG. 4J shows a configuration (schematically shown in FIG. 3B) having a dual-shaft (one shaft shown) multi-stage continuous fiber-slurry mixer of the present invention in which the first mixing section has paddles and the second mixing section has augers followed by paddles on both shafts (one shaft shown for clarity), wherein the paddles are flat paddles or helical paddles, the empty space between paddles where the shaft is visible is intended to convey presence of paddles.

FIG. 4L shows a configuration (schematically shown in FIG. 3D) having a dual-shaft (one shaft shown) multi-stage continuous fiber-slurry mixer of the present invention in which the first mixing section has paddles and the second mixing section has paddles on both shafts, wherein the paddles are flat paddles or helical paddles; the empty space where the shaft is visible is intended to convey presence of paddles.

FIG. 6 shows the cementitious panel production line of FIG. 5 as a composite view of a process flow chart for the portion of the cementitious panel production line upstream of the headbox and a top view of the cementitious panel production line downstream of the headbox.

FIG. 7 shows a first variation of the cementitious panel production line of FIG. 5 as a composite view of a process flow chart for the portion of the cementitious panel production line suitable for use with the present fiber-slurry mixing device upstream of the headbox and a top view of the production line downstream of the headbox.

FIG. 8 shows a second variation of the cementitious panel production line of FIG. 5 as a composite view of a process flow chart for the portion of the cementitious panel production line suitable for use with the present fiber-slurry mixing device upstream of the headbox and a top view of the production line downstream of the headbox.

DETAILED DESCRIPTION OF THE INVENTION

Figure 1:
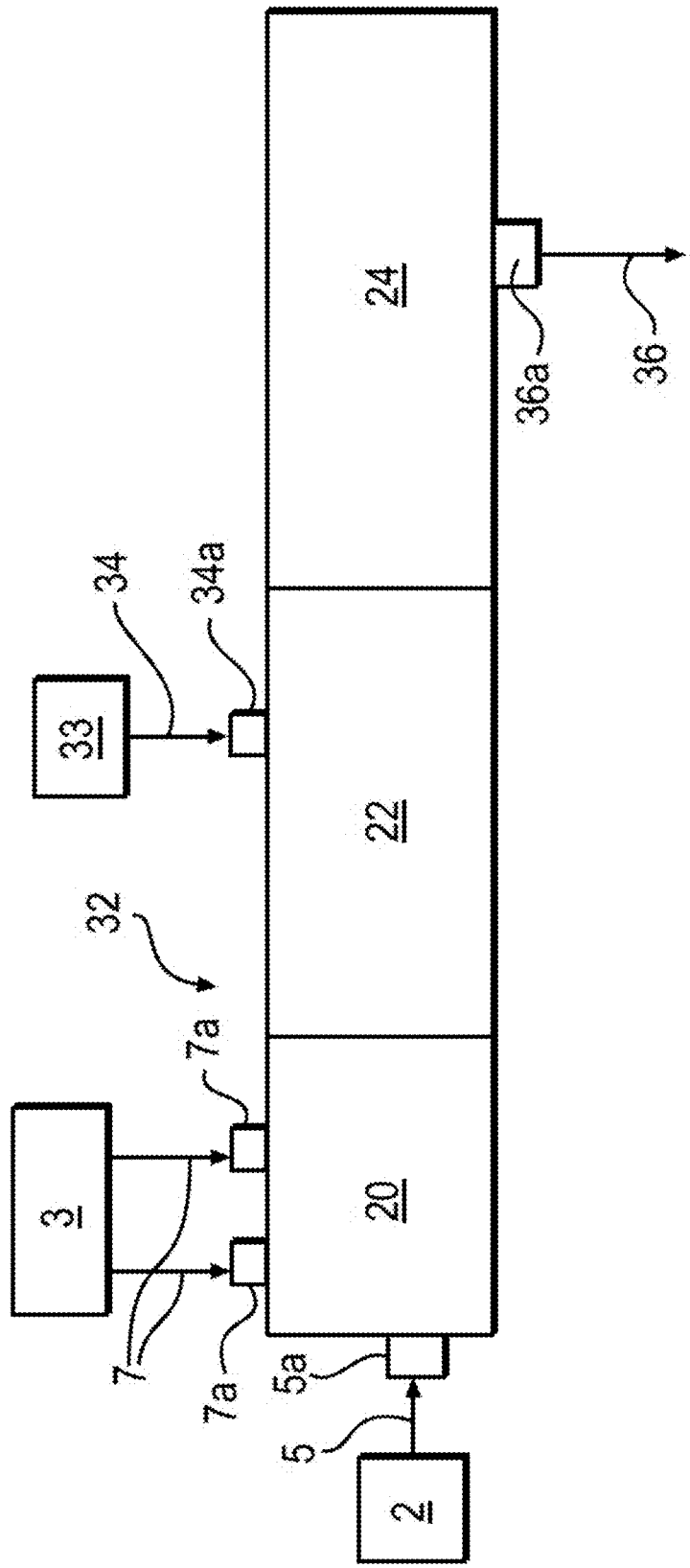
FIG. 1 shows a block flow diagram of the method of the present invention.

FIG. 1 shows a block flow diagram of the method of the present invention. In the method stream 5 of dry cementitious powder from a dry powder feeder 2 passes through a dry cementitious powder inlet conduit 5A to feed a first feed section 20 of a fiber-slurry mixer 32. An aqueous medium stream 7 from one or more pumps 3 passes through at least one aqueous medium stream conduit 7A (two shown) to feed a first mixing section 22 and optionally also the first feed section 20 of the fiber-slurry mixer 32. A stream 34 of reinforcing fibers passes from a fiber feeder 33 through a reinforcing fibers stream conduit 34A to feed a second mixing section 24 of the fiber-slurry mixer 32. The stream 5 of dry cementitious powder, aqueous medium stream 7, and stream 34 of reinforcing fibers combine in the fiber-slurry mixer 32 to make a stream of fiber-cement mixture 36 which discharges through a discharge conduit 36A at a downstream end of the mixer 32.

The resulting fiber-slurry mixture is suitable for a variety of uses. For example, the resulting slurry is suitable for being deposited and used as statuary, shotcrete, consolidation of loose rock, soil stabilization, pre-cast concrete products, pavement, repair application, or as a layer on a moving surface of a panel production line uniformly as a layer 0.125 to 2.00 inches thick, preferably 0.25 to 1 inches thick, more preferably 0.4 to 0.8 inches thick, typically 0.5 to 0.75 inches thick on the moving surface of the panel production line to produce a fiber reinforced concrete panel. The resulting fiber-slurry mixture has a viscosity less than 45000 centipoise, preferably less than 30000 centipoise, and more preferably less than 15000 centipoise. Typically the resulting fiber-slurry mixtures have a viscosity of at least 1500 centipoise. The resulting fiber-slurry mixture also has a slump according to the slump test using a 4 inch tall 2 inch diameter pipe is from 4 to 11 inches. The resulting fiber-slurry mixture is not suitable for extrusion manufacturing processes that typically rely on slurry mixture compositions having extremely high viscosity.

The slump test characterizes the slump and flow behavior of the cementitious compositions produced by this invention. The slump test used herein utilizes a hollow cylinder about 5.08 cm. (2 in.) diameter and about 10.16 cm. (4 in.) length held vertically with one open end resting on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. As used herein, compositions with good flow behavior yield a larger slump value.

As seen in FIGS. 3A-3D and 4A-4M the invention employs the following primary mixer variations:
Mixer Dry Powder Inlet
Auger (to move the dry powder to the first mixing section with paddles)
First Mixing Section—Paddles (one type or another)
Second Mixing Section—Various scenarios possible—Only Auger, Only Paddles, or a combination of augers and paddles.

Horizontal Fiber-Slurry Continuous Mixer

The fiber-slurry continuous mixer of the present invention preferably achieves the following results:

Allows continuous blending of fibers with the rest of the cementitious components to produce a uniformly mixed fiber reinforced cementitious slurry mixture.

Reduces the required mixing time from several minutes to less than 60 seconds, preferably less than 30 seconds, to produce a uniformly blended fiber reinforced cementitious slurry mixture. Generally the chamber provides an average slurry residence time of about 5 to about 240 seconds, preferably 10 to 180 seconds, more preferably 10 to 120 seconds, most preferably 10 to 60 seconds.

Does not cause fiber balling and lumping during the mixing operation.

Does not cause damage to the reinforcing fibers as a result of the mixing action.

Allows use of rapid setting cementitious materials useful in manufacturing and construction applications.

The method of using the horizontal fiber-slurry continuous mixer disclosed as part of this invention comprising the steps of:

feeding a dry cementitious powder into a horizontal continuous slurry mixer through at least one dry cementitious powder inlet port;
the horizontal continuous mixer comprising
an elongated mixing chamber, the elongated mixing chamber defined by a horizontal (typically cylindrical) housing having an interior side wall, the elongated mixing chamber having an upstream end feed section, a first mixing section, and a second downstream end mixing section, wherein the first mixing section is between the upstream end feed section and the second downstream end mixing section,
at least a pair of horizontally oriented intermeshing self-wiping impellers traversing from an upstream end of the elongated mixing chamber to a downstream end of the elongated mixing chamber and rotating within the elongated mixing chamber,
wherein each horizontally mounted impeller within the upstream end feed section of the elongated mixing chamber comprises an auger, wherein the dry cementitious powder is fed into the upstream end feed section of the elongated mixing chamber and conveyed by the auger to the first mixing section, feeding a liquid stream comprising water into the elongated mixing chamber of the continuous slurry mixer through at least one liquid stream inlet port downstream of the at least one dry cementitious powder inlet port and mixing the dry cementitious powder and the liquid stream in the first mixing section to form a cementitious slurry;

wherein each horizontally mounted impeller within the first mixing section comprises a first plurality of mixing and conveying paddles mounted on a horizontally oriented shaft of the impeller at regular intervals and different circumferential locations, the paddles rotated about the horizontally oriented shaft within the horizontal, preferably cylindrical, housing, the paddles extending radially from the shaft, feeding a stream of reinforcement fibers through at least one reinforcement fiber inlet port into the second mixing section, and mixing the cementitious slurry and the reinforcement fibers in the second mixing section to form a fiber-slurry mixture, wherein at least a portion of each horizontally mounted impeller within the second mixing section of the elongated mixing chamber comprises at least one member selected from the group consisting of:

an auger, and a second plurality of mixing and conveying paddles mounted on the horizontally oriented shaft of the mixer at regular intervals and different circumferential locations, the paddles rotated about each respective horizontally oriented shaft within the horizontal (preferably cylindrical) housing, the paddles extending radially from the respective shaft, discharging the fiber-slurry mixture from the mixer through a fiber-slurry mixture outlet port at a downstream end portion of the second mixing section, wherein the cementitious slurry and fibers are mixed in the mixing chamber of the horizontal continuous mixer for an average mixing residence time of about 5 to about 240 seconds, preferably 10 to 180 seconds, more preferably 10 to 120 seconds, most preferably 10 to 60 seconds while the rotating paddles apply shear force, wherein the central rotating shaft rotates at 30 to 450 RPM, more preferably 40 to 300 RPM, and most preferably 50 to 250 RPM during mixing, to the fiber-slurry mixture to produce a uniform fiber-slurry mixture, wherein the fiber-slurry mixture discharged from the mixer has a slump of 4 to 11 inches, preferably 6 to 10 inches, as measured according to a slump test using a 4 inch tall and 2 inch diameter pipe and a viscosity less than 45000 centipoise, preferably less than 30000 centipoise, and more preferably less than 15000 centipoise.

The resulting fiber-slurry mixture also has a slump according to the slump test using a 4 inch tall 2 inch diameter pipe is from 4 to 11 inches. The resulting fiber-slurry mixture is not suitable for extrusion manufacturing processes that typically rely on slurry mixture compositions having extremely high viscosity.

Each horizontally oriented shaft is externally connected to a drive mechanism and a drive motor, for example, powered by electricity, fuel gas, gasoline, or other hydrocarbon, to accomplish shaft rotation when the mixer is in operation.

The paddles of the first and/or second mixing sections may be flat paddles or helical paddles. Flat paddles and helical paddles are unitary paddles having a central opening fitted to the shaft such that the paddle encircles a portion of the shaft. Also, the flat paddles and helical paddles have opposed ends extending in opposite directions from the shaft. Preferably if the flat paddles or helical paddles are employed in the second mixing section they are employed in a paddle portion of the second mixing section and an auger is also employed in the second mixing section before and/or after the paddle section.

However, in the alternative the paddle of the first and/or second mixing sections comprises a pin engaged to a broad paddle head, the pin pivotally engaged to the horizontally oriented shaft and/or the paddle head to permit pivotal rotation of the paddle head relative to the respective location on the horizontally oriented shaft, wherein the paddles are arranged to mix the reinforcement fibers and cementitious slurry and move the cementitious slurry and reinforcement fibers being mixed to the fiber-slurry mixture outlet. Preferably if the paddles of the first and second mixing section each comprise the pin engaged to the paddle head then the second mixing section has an absence of an auger. The second mixing section can optionally have only pins (without paddle head) to mix fibers with the slurry. The cross-sectional shape of the pin can either be round, flat (i.e., square or rectangular), triangular, oval or any other shape. When pins with elongated cross-section are employed (example, rectangular or oval cross-section), the pins are preferably oriented such that they not only help to mix the material but also provide the function of moving the material forward toward the mixer outlet.

The central shaft is externally connected to a drive mechanism and a drive motor, for example, powered by electricity, fuel gas, gasoline, or other hydrocarbon, to accomplish shaft rotation when the mixer is in operation. Typically an electrical motor and drive mechanism will drive the central shaft in the mixing chamber.

A distinctive feature of the mixer and mixing method disclosed herein is the ability of this mixer to blend reinforcing fibers with the rest of the cementitious components in a continuous operation without unduly damaging the added fibers. Furthermore, the mixer and mixing method of this invention allow production of a fiber reinforced cementitious slurry mixture having a desirable working consistency. The fiber-slurry mixtures discharged from the multi-stage fiber-slurry mixer are suitable for a variety of uses, for example statuary, shotcrete, consolidation of loose rock, soil stabilization, pre-cast concrete products, pavement, repair application, or to make a fiber reinforced concrete building panel or board. For instance, a workable slurry consistency facilitates further processing and formation of panel products on a continuous forming line running at high line speeds.

The uniform fiber-slurry mixture produced has a consistency that will allow the fiber-slurry mixture to be discharged from the horizontal fiber-slurry mixer and be suitable for being deposited as a continuous layer on a moving surface of a panel production line uniformly as a layer 0.25 to 2.00 inches thick, preferably 0.25 to 1 inches thick, typically 0.5 to 0.75 inches thick on the moving surface of the panel production line to produce a fiber reinforced concrete panel.

The multi-stage continuous mixer of this invention can either be a dual-shaft mixer or a multi-shaft mixer. Preferably, the multi-stage continuous mixer of this invention is a dual-shaft mixer.

The multi-stage continuous mixer of this invention has an initial auger section and at least two mixing sections. The dry powders are introduced into the mixer through an inlet port located at one end of the mixer. The augers located in the auger section move the dry powders forward into the first mixing section. The first mixing section is intended for mixing the dry powders with the liquid additives including water to produce a uniform blend of cementitious slurry mixture. The cementitious slurry mixture so produced in the first section of the mixer is conveyed to the second mixer section. The second mixing section is where fibers are blended with cementitious slurry produced and conveyed from the first mixer section. The resultant fiber reinforced slurry mixture exits the mixer through an outlet port located at the end of the second mixer section.

The various key components and features of a multi-stage, dual-shaft (or multi-shaft) continuous mixer disclosed as part of this invention can be highlighted as follows:

An elongated mixing chamber

The elongated double barrel mixing chamber houses the dual rotating shafts (or multi rotating shafts) of the continuous mixer.

The total length of the mixing chamber typically ranges from about 2 to 8 feet. The preferred length of the mixing chamber is typically from about 3 to 6 feet.

The diameter of the mixing chamber typically ranges anywhere from about 3 to 24 inches. The diameter of the mixing chamber preferably ranges from about 5 to 12 inches.

Dual rotating shafts (or multi rotating shafts) mounted in the elongated mixing chamber traverse from one end of the mixer to another. The shafts are externally connected to a drive mechanism and an electrical motor to accomplish shaft rotation when the mixer is in operation. The shafts rotate at a speed, ranging from 30 to 450 RPM, more preferably 40 to 300 RPM, and most preferably 50 to 250 RPM. As part of the mixer development and optimization work, it has been discovered that relatively lower mixer speeds are preferable and provide excellent dispersion of fibers in the cementitious slurry mixture. Furthermore, another important benefit of using lower mixing speeds for the purposes of this invention is that it results in reduced fiber breakage and superior material working properties useful in further processing of the fiber reinforced cementitious slurry mixture. A variable frequency drive along with gearing, chain or a belt arrangement is typically used with the mixer for turning the rotating shaft when the mixer is in operation. The variable frequency drive is helpful for adjusting and fine-tuning the mixer speed for a given combination of raw materials involved in the production process.

An auger section is used to convey the dry powders from the mixer inlet port to the first mixing section of the continuous mixer. The initial length of the mixer shafts is in the form of an auger that accomplishes movement of the dry powder forward. When dual-shafts (or multi-shafts) are used in the mixer, the individual shafts are positioned in the mixer such that the flights from one auger section are in overlapping position (but non-interfering during shaft rotation) to the flights from the second auger section. This overlapping placement of the two auger sections in the mixer provides self-cleaning action to the auger section of the mixer. The initial auger section (located near the dry powder mixer inlet) in a dual-shaft mixer configuration are shown in FIGS. 2A and 2B.

Figure 2A:
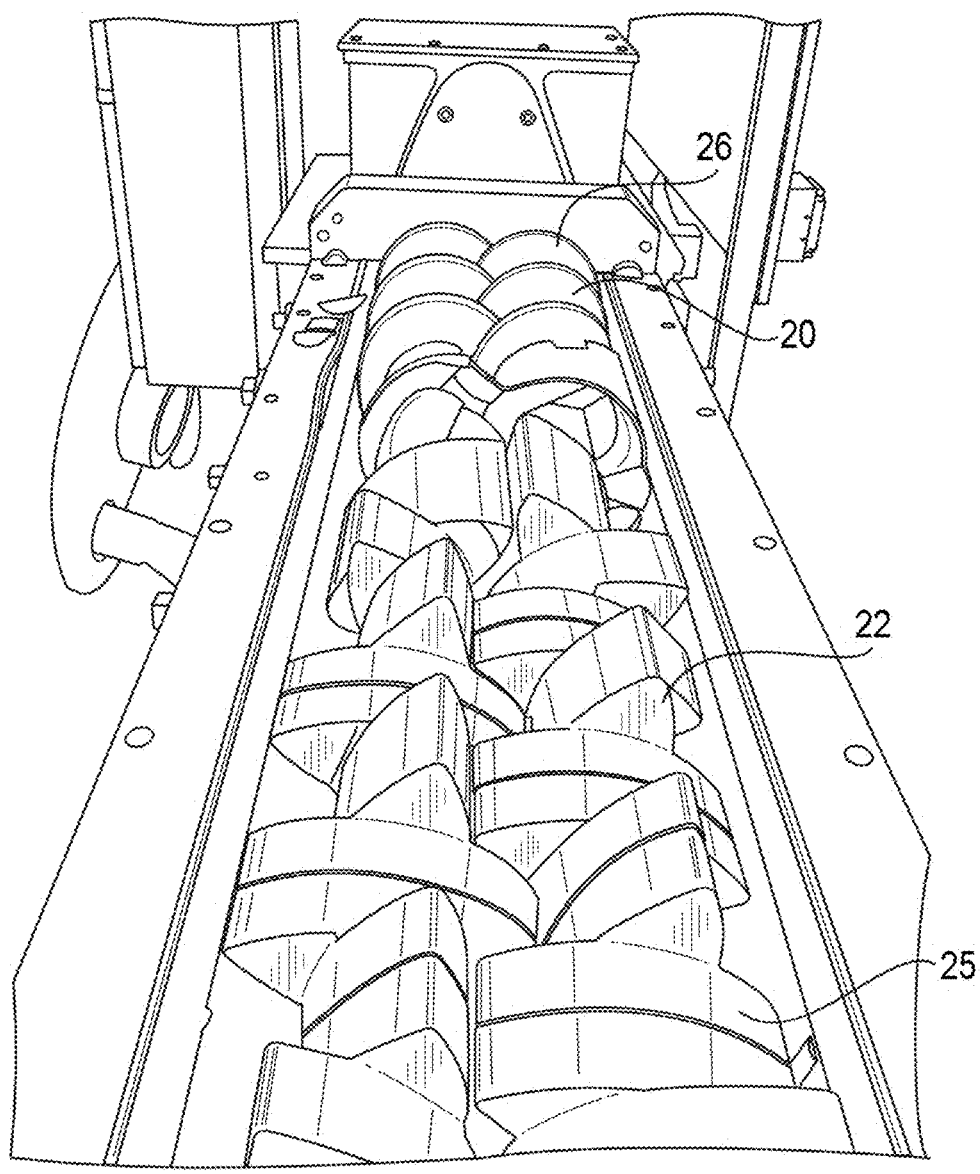
FIG. 2A shows an auger section at the mixer inlet and flat paddles mounted on the two shafts in the first mixing section of the horizontal dual shaft multi-stage continuous fiber-slurry mixer embodiment of the present fiber-slurry mixing device.

FIG. 2A shows the horizontal dual shaft multi-stage continuous fiber-slurry mixer embodiment of the present fiber-slurry mixing device. In particular, FIG. 2A shows a first feed section 20 (also known as an auger section) having an auger 26 at the mixer inlet. FIG. 2A also shows a first mixing section 22 having flat paddles 25 mounted on the two shafts.

Figure 2F:
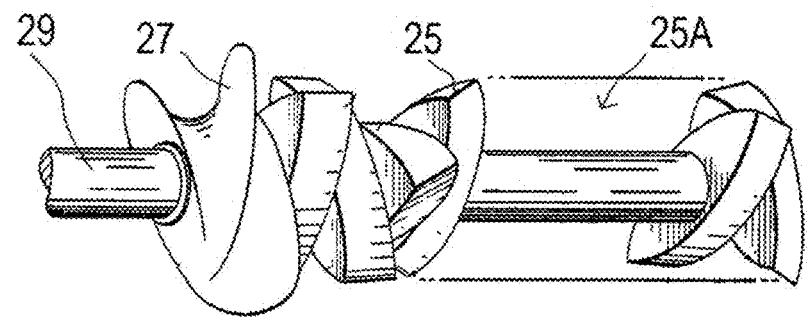
FIG. 2F shows flat paddles and a helical paddle on a shaft.
Figure 2B:
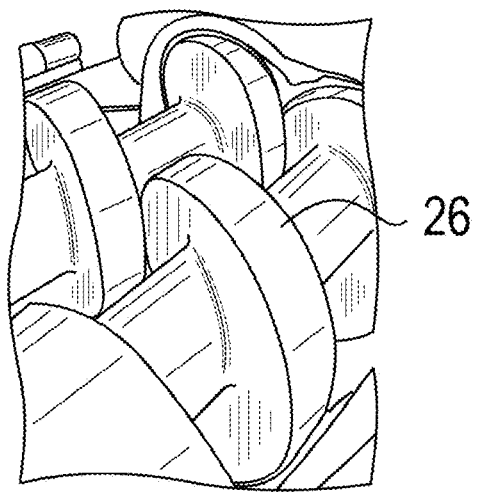
FIG. 2B shows a portion of the auger section at the mixer dry powder inlet in a horizontal dual shaft multi-stage continuous fiber-slurry mixer embodiment of the present fiber-slurry mixing device.

FIG. 2B shows another view of the augers 26 in the first feed section 20 (also known as an auger section) of the present fiber-slurry mixer 32. The length of first feed section 20 is typically from about 1 to 3 feet. The auger flight pitch may be varied depending upon the raw materials used, raw material feed rates desired, and the design configuration of the two mixing sections of the mixer.

Figure 2C:
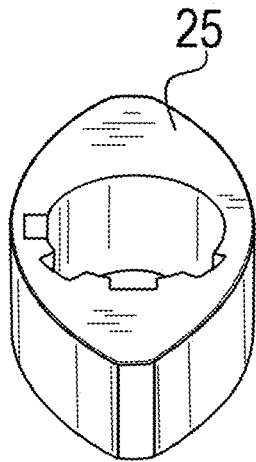
FIG. 2C shows a flat mixing paddle of the horizontal dual shaft multi-stage continuous fiber-slurry mixer embodiment of the present fiber-slurry mixing device.
Figure 2D:
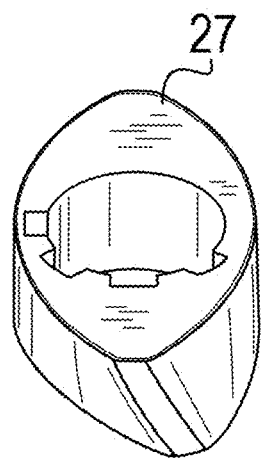
FIG. 2D shows a helical mixing paddle suitable for use in the horizontal dual shaft multi-stage continuous fiber-slurry mixer embodiment of the present fiber-slurry mixing device.

The first mixing section 20 comprises mixing paddles 25 mounted on the individual rotating shafts of the mixer. There are two types of paddles that are typically used in the first mixing section—flat or helical. FIG. 2C shows a flat mixing paddle 25 as used in FIG. 2A. FIG. 2D shows a helical mixing paddle 27 that can be used in the first mixing section of this mixer. The flat paddles 25 provide a high shear mixing action with negligible conveying action to the material in the mixer. On the other hand, the helical paddles 27 provide both the mixing and (limited) conveying actions to the material in the mixer.

Flat paddles 25 and helical paddles 27 are unitary (one piece) paddles having a central opening fitted to the shaft such that the paddle encircles a portion of the shaft. Also, the flat paddles and helical paddles have opposed ends extending in opposite directions from the shaft. Flat paddles 25 and helical paddles 27 have a central hole with key slots cut into them to allow the paddles to slide and mount onto a keyed shaft. The paddles are concentrically mounted and keyed on to the shaft. The orientation of the adjacent paddles mounted on the two shafts of the dual shaft mixer is such that they provide wiping action without any rotational interference, FIG. 2F shows flat paddles 25 and a helical paddle 27 on a shaft 29. Space 25A represents being filled by flat paddles 25 and/or helical 27 paddles.

Other paddle shapes and geometries can also be used in the first mixing section of the mixer. For example, of mixing and conveying paddles which each comprise a pin engaged to a paddle head can be employed in the first and/or second mixing sections as explained in more detail below regarding FIG. 4A.

Figure 2E:
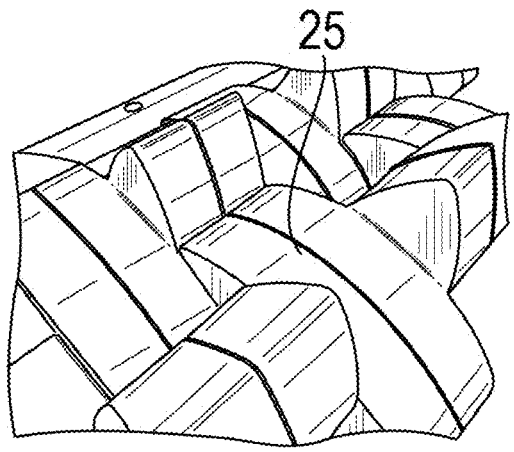
FIG. 2E shows flat paddles mounted on the two shafts in the first mixing section of the horizontal dual shaft multi-stage continuous fiber-slurry mixer embodiment of the present fiber-slurry mixing device.

The paddles mounted on the individual shafts are in over-lapping but non-interfering orientation when the mixer shafts are in rotational mode during the mixer operation. FIGS. 2A and 2E show flat paddles 25 mounted on the two shafts (in the first mixing section) of a dual-shaft mixer. In particular, FIG. 2E shows an enlarged view of flat paddles 25 mounted on the two shafts in the first mixing section of the horizontal dual shaft multi-stage continuous fiber-slurry mixer embodiment of the present fiber-slurry mixing device. However, helical paddles 27 can be substituted for some or all of the flat paddles 25.

The primary purpose of the paddles situated in the first mixing section 22 of the mixer 32 is to blend the dry powder with the water and other liquid additives (if any) to produce a uniform cementitious slurry mixture. Due to the overlapping but non-interfering orientation of the paddles, the rotation of the paddles 25 mounted on the individual shafts provides a self-cleaning action to the first mixing section 22 of the mixer 32. The flat 25 or helical 27 mixing paddles mounted on the two shafts are particularly useful in this regard. This provides excellent self-cleaning action due to the scraping action of the paddles against each other and against the barrel (shell) of the mixer. Flat paddles are the most preferred paddles, as opposed to helical paddles, for use in the first mixing section 22 for the purposes of this invention. The length of the first mixing section 22 is typically from about 1 to 4 feet. More typically, the length of the first mixing section is about 3 feet or less. The width of the individual flat or helical mixing paddles ranges from about 0.25" to 4". More typically, the width of the mixing flat or helical paddles is from 0.50" to 3". More typically, the width of the mixing flat or helical paddles is from 1" to 2". The clearance of the mixing paddles, regardless of whether flat, or helical or another shape, from the mixer shell is preferably less than ¼", more preferably less than ⅛", and most preferably less than ¹⁄₁₆".

The second mixing section 24 of the mixer 32 is where the reinforcing fibers are typically introduced into the mixer and blended with the cementitious slurry. The second mixing section 24 is essentially a continuation of the first mixing section 22 and utilizes one or more means to blend fibers into the cementitious slurry. The reinforcing fibers through conduit 34 are introduced into the continuous mixer 32 at the beginning of the second mixing section 24. The reinforcing fibers are blended with the cementitious slurry produced in the first mixing section 22 using either mixing paddles or augers or a combination thereof. The mixing paddles and/or augers are mounted on the dual rotating shafts of the mixer and help to blend the reinforcing fibers with the cementitious slurry mixture conveyed from the first mixing section. The mixing paddles (flat paddles 25 and/or helical paddles 27) as described and used in the first mixing section 22 may be used in the second mixing section 24 as well. However, use of such paddles has been found to cause significant fiber damage due to the high shear action provided by the paddles. Therefore, use of such paddles alone in the second mixing section is not preferred, particularly when a large number of such paddles are used. Helical paddles are better suited than the flat paddles in the second mixing section to meet the objectives of this invention.

Augers can also be used for blending of fibers with the cementitious slurry in the second mixing section 24. Augers used on their own provide a rapid conveying action and a relatively less mixing action than that provided by the paddles alone. The augers mounted on the two parallel shafts in overlapping configuration further help with the self-cleaning aspect of the mixer.

Preferably if the flat paddles 25 or helical paddles 27 are employed in the second mixing section 24 they are employed in a paddle portion of the second mixing section 24 and an auger is also employed in the second mixing section 24 before and/or after the paddle section. A combination of augers and a limited number of helical paddles (or less preferably flat paddles) may also be used in the second mixing section 24. Such combination is in fact preferred and recommended for achieving best mixing results for blending of fibers with the cementitious slurry. The use of a limited numbers of helical (or flat) paddles after the augers in the second mixing section 24 causes a resistance to the material flow through the mixer. This resistance to material flow provides for a better mixing and wet-out of fibers with the cementitious slurry in the second mixing section of the mixer.

Figure 3A:
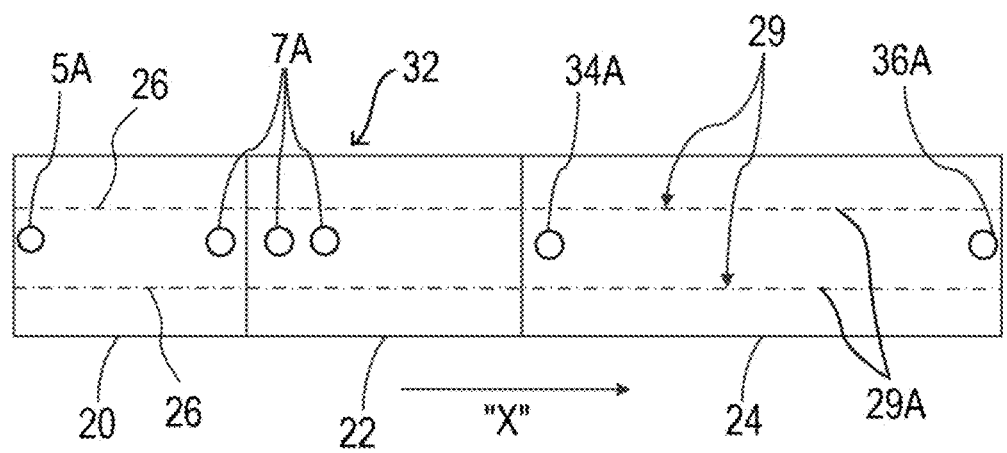
FIG. 3A shows a first configuration of a dual-shaft multi-stage continuous fiber-slurry mixer of the present invention in which the first section has mixing paddles and the second mixing section has only augers on both shafts.

To summarize, the second mixing section 24 can be configured in one or more ways as highlighted below to facilitate mixing of fibers with the cementitious slurry mixture:

FIG. 3A shows a first configuration of a dual-shaft multi-stage continuous fiber-slurry mixer 32 of the present invention with material flow in the mixer in direction "X". In the first configuration, augers 26 are mounted on both impeller shafts 29 in the first feed section 20, mixing paddles are mounted on both impeller shafts 29 in the first mixing section 22, and augers 29A only are mounted on both impeller shafts 29 in the second mixing section 24. The auger parameters (example, auger pitch, auger length) are selected to maximize material retention and promote a more intimate contact between the fibers and the cementitious slurry in the mixer 32. The total length of the second mixing section and augers ranges from about 1 to 5 feet, more preferably from about 2 to 4 feet. In this and other drawings of this specification like reference numbers in the drawings are intended to identify like elements unless otherwise indicated.

Figure 3B:
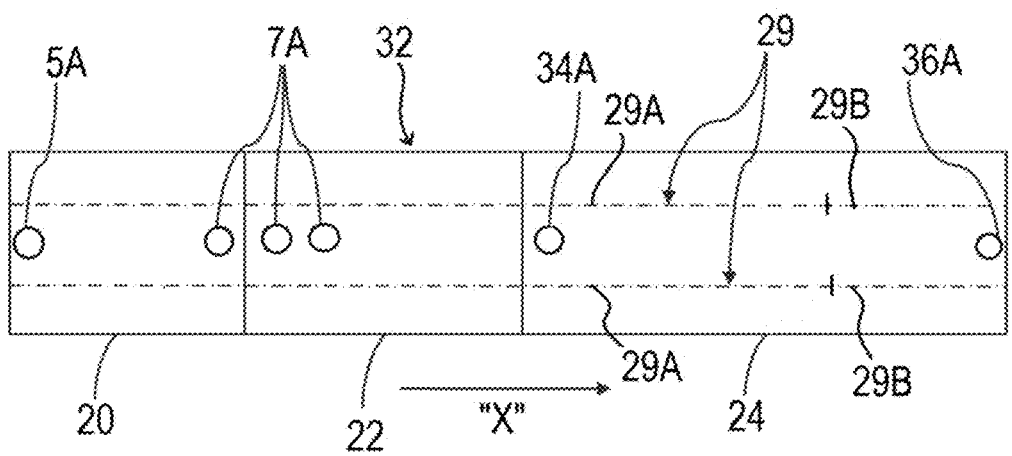
FIG. 3B shows a second configuration of a dual-shaft multi-stage continuous fiber-slurry mixer of the present invention in which the first mixing section has paddles and the second mixing section has augers followed by paddles on both shafts.

FIG. 3B shows a second configuration of a dual-shaft multi-stage continuous fiber-slurry mixer 32 of the present invention with material flow in the mixer in direction "X". In the second configuration, augers 29A followed by mixing/conveying paddles 29B mounted on both shafts 29 in the second mixing section. Both flat paddles 25 or helical paddles 27 may be used as mixing/conveying paddles 29B. The use of helical paddles 7 is preferred in the second mixing section. The adjacent flat or helical paddles mounted to a singular shaft in the second mixing section can have the same orientation with respect to each other or alternatively they may be rotated with respect to each other. When the adjacent paddles on a shaft are rotated with respect to each other, the angle of rotation of the adjacent paddles may range from 0° to 90°, typically 20° to 90°. A greater number of paddles can be used in the second mixing section when the adjacent paddles have a zero degree rotation with respect to each other. Some of the helical paddles 27 used may also be placed in the reverse direction if desired to increase the resistance to material flow and fiber-slurry mixing action taking place in the augers 29A. When flat or helical paddles are used, the number of paddle sets (paddles per shaft) in the second mixing section 24 preferably ranges 1 from 20, more preferably from 1 to 10. The paddle parameters (type, dimensions, orientation, number, and configuration) are selected to minimize the shearing action the material is subjected to in the mixer 32. The paddles can be made of variety of materials including metals, ceramics, plastics, rubber, or a combination thereof. Paddles with softer lining materials are also contemplated for use in the second mixing section as they tend to minimize material and fiber damage. Paddles with a pin and a head or only pins may alternatively be used in the second mixing section after the auger.

The auger parameters (example, auger pitch, auger length) are selected to maximize material retention and promote a more intimate contact between the fibers and the cementitious slurry in the mixer 32. The total length of the second mixing section ranges from about 1 to 5 feet, more preferably from about 2 to 4 feet. Only a small portion of this length is taken up by the paddles 29B and a majority of the second mixing section 24 is covered by the augers 29A.

Figure 3C:
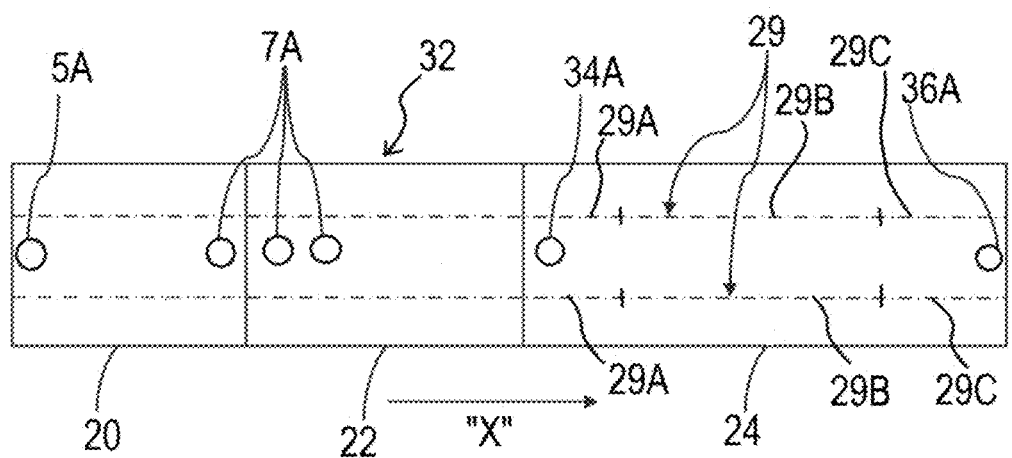
FIG. 3C shows a third configuration of a dual-shaft multi-stage continuous fiber-slurry mixer of the present invention in which the first mixing section has paddles and the second mixing section has an auger followed by paddle/s followed by an auger on both shafts.

FIG. 3C shows a third configuration of a dual-shaft multi-stage continuous fiber-slurry mixer 32 of the present invention with material flow in the mixer in direction "X". The third configuration has augers 29A followed by mixing/conveying paddles 29B followed by augers 29C mounted on both shafts 29 in the second mixing section. Both flat paddles 25 or helical paddles 27 may be used as mixing/conveying paddles 29B but the use of helical paddles 27 is preferred. Some of the helical paddles 27 used may also be placed in the reverse direction if desired to increase the residence time and improve fiber-slurry mixing in the previous auger section. The adjacent flat or helical paddles mounted to a singular shaft in the second mixing section can have the same orientation with respect to each other or alternatively they may be rotated with respect to each other. When the adjacent paddles on a shaft are rotated with respect to each other, the angle of rotation of the adjacent paddles may range from 0° to 90°, typically 20° to 90°. When flat or helical paddles are used, the number of paddle sets in the second mixing section 24 preferably ranges from 1 to 20 and more preferably from 1 to 10. A greater number of paddles can be used in the second mixing section when the adjacent paddles have a zero degree rotation with respect to each other. The paddle parameters (type, dimensions, orientation, number, and configuration) are selected to minimize the shearing action the material is subjected to in the mixer 32. Paddles with a pin and a head or only pins may alternatively be used in the second mixing section after the auger. The auger parameters (example, auger pitch, auger length) are selected to maximize material retention and promote a more intimate contact between the fibers and the cementitious slurry in the mixer. The total length of the second mixing section ranges from about 1 to 5 feet, more preferably from about 2 to 4 feet. Only a small portion of this length is taken up by the paddles and a majority of the second mixing section is covered by the augers.

Figure 3D:
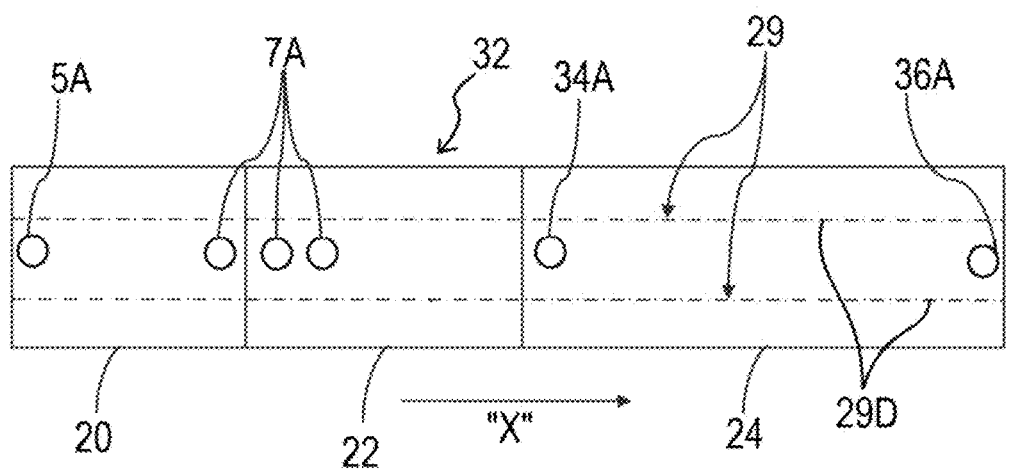
FIG. 3D shows a fourth configuration of a dual-shaft multi-stage continuous fiber-slurry mixer of the present invention in which the first mixing section has paddles and the second mixing section has only paddles or pins on both shafts.

FIG. 3D shows a fourth configuration of a dual-shaft multi-stage continuous fiber-slurry mixer 32 of the present invention with material flow in the mixer in direction "X". The fourth configuration has mixing/conveying paddles 29D only mounted on both shafts 29 in the second mixing section of the mixer. The use of flat and helical paddles in the second mixing section is not preferred in this configuration since their use results in very high shear and causes significant fiber damage. Mixing and conveying paddles that cause low mixing shear are preferred when this mixer configuration is utilized in the second mixing section. Use of paddles with a pin and a head or only pins is preferred in the second mixing section of this mixer configuration. However, in this embodiment, it is acceptable to use any type of paddles, for example flat and/or helical paddles, in the first mixing section.

Figure 4A:
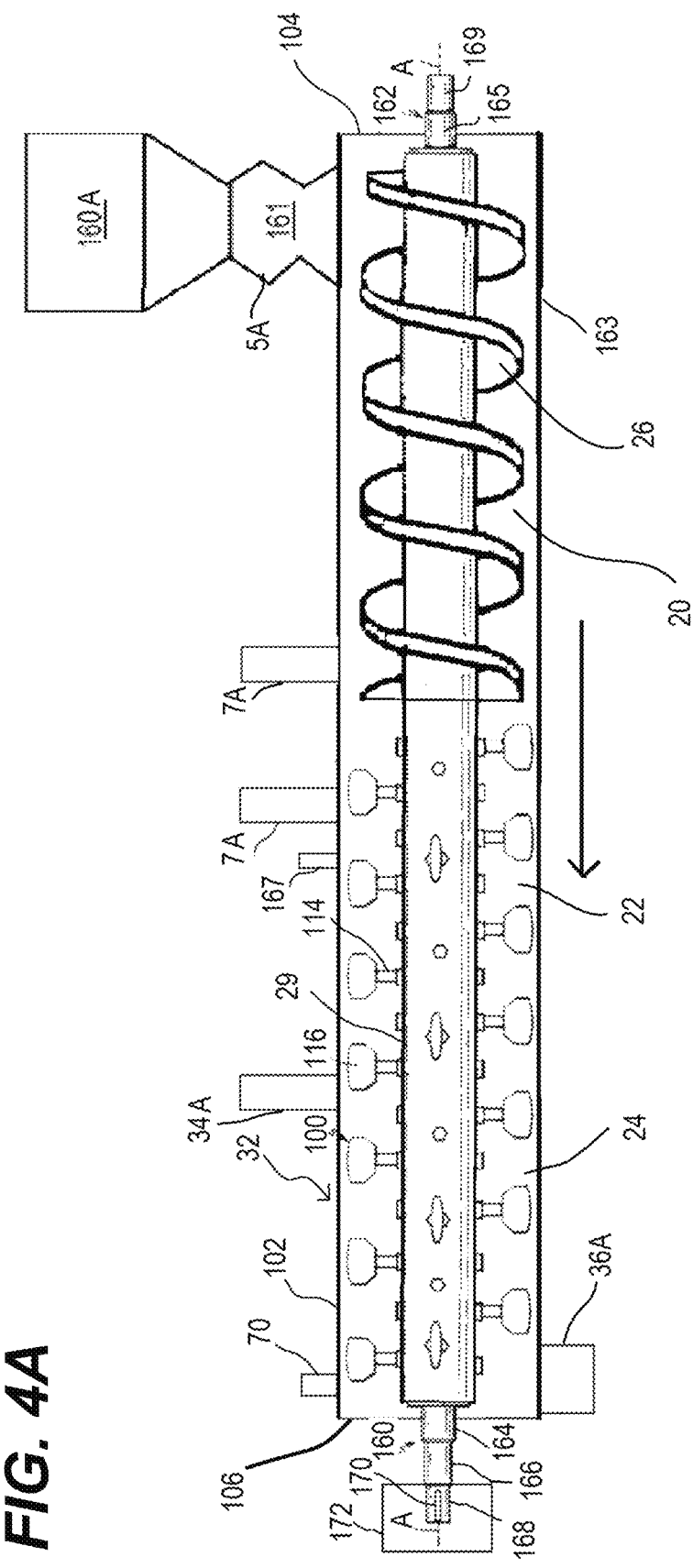
FIG. 4A shows a diagrammatic elevational side view of the configuration (schematically shown in FIG. 3D) of the horizontal dual-shaft (one shaft shown) multi-stage continuous fiber-slurry mixer of the present invention in which the first mixing section has paddles and the second mixing section has only paddles.

FIG. 4A shows a drawing of an embodiment of the configuration (schematically shown in FIG. 3D) of the dual shaft (one shaft shown) fiber-slurry mixer 32 using such paddles 100 that cause low mixing shear in both the first mixing section 22 and the second mixing section 24. FIG. 4A shows the first feed section 20 having an auger 26, the shaft 29, and paddles 100. The paddles 100 having a pin 114 and a broad paddle head 116 that extends transverse relative to the pin 114. Preferably the fiber-slurry mixer 2 is a single shaft mixer.

FIG. 4A shows a powder mixture of, for example, Portland cement, gypsum, aggregate, fillers, etc. is fed from the dry powder feeder which is typically an overhead hopper bin 160A through a dry powder conduit 5A, which is a bellows 161, to an elongated horizontal mixing chamber 163 of mixer 32. The impeller shaft 29 is driven by a side mounted impeller motor 172 that is regulated by a speed controller (not shown). The powder mixture solids may be fed from the hopper bin 160A to the horizontal mixing chamber 163 containing the auger 26 by a volumetric feeder or a gravimetric feeder (not shown).

Volumetric feeding systems would use an auger screw conveyor (not shown) running at a constant speed to discharge powder from the storage hopper bin 160A at a constant rate (volume per unit time, e.g., cubic feet per minute). Gravimetric feeding systems generally use a volumetric feeder associated with a weighing system to control the discharge of powder from the storage hopper bin 160A at a constant weight per unit of time, e.g., pounds per minute. The weight signal is used via a feedback control system to constantly monitor the actual feed rate and compensate for variations in bulk density, porosity, etc. by adjusting the speed (RPM) of the auger screw of the auger screw feeder. Such volumetric feeding systems can also be used for any other embodiments of the mixer 32.

Aqueous medium, such as water, from a liquid pump (not shown) feeds the horizontal chamber 163 through a nozzle of at least one aqueous medium stream conduit 7A.

FIG. 4A shows the elongated horizontal mixing chamber 163 comprises cylindrical horizontal sidewalls 102, a first end wall 104, and a second end wall 106. Material flow is in a direction X from the first end wall 104 to the second end wall 106. Shaft 29 extends from first end wall 104 to second end wall 106. The horizontal fiber-cementitious slurry mixer 32 also comprises at least one rotatable shaft 29 (preferably two rotatable shafts, wherein the second shaft is not shown for clarity), an aqueous liquid medium conduit 7A for feeding liquid comprising water into the chamber 163, a reinforcement fiber conduit 34A for feeding reinforcement fiber into the chamber 163, and a fiber-slurry mixture discharge outlet 36A for discharging fiber-slurry mixture. Mixing and conveying paddles 100 extend from the central rotatable shaft 29. The horizontal fiber-cementitious slurry mixer 32 also comprises other inlet ports 167, one shown, to feed other raw materials and performance enhancing additives into the mixer 32. The horizontal fiber-cementitious slurry mixer 32 also comprises a venting port 70 to remove any air introduced into the mixing chamber 163 from raw material feed. The horizontal fiber-cementitious slurry mixer 32 also comprises an electrical motor and drive mechanism 172 to drive the central shaft 29 in the mixing chamber 163.

The rotatable shaft 29 rotates about its longitudinal axis "A" to mix the fed ingredients and convey them as fiber-slurry mixture to the discharge outlet 168. The rotatable shaft has the auger 26 in the chamber first feed section 20, and paddles 100 in both the first mixing section 22 and the second mixing section 24.

The reinforcement fibers and cementitious slurry and other ingredients will be fed to the mixer 32 at respective rates to leave an open space in the mixer above resulting mixture to facilitate mixing and conveying. If desired, a liquid level control sensor is used to measure the level of the slurry in the horizontal chamber of the mixer.

The rotatable shaft 29 may include a first end assembly 160 and a second end assembly 162. First end assembly 160 and second end assembly 162 may take any of a wide variety of forms known to one of skill in the art. For example, first end assembly 160 may include a first end engagement portion that operatively engages a first end of the rotatable shaft 29, a first cylindrical portion 164 extending from the first end engagement portion, an intermediate cylindrical portion 166 extending from the first cylindrical portion 164, and an end cylindrical portion 168, extending from the intermediate cylindrical portion 166 and including a slot 170. The second end assembly 162 may include a second end engagement portion that operatively engages a second end of the rotatable shaft 29, a first cylindrical portion 165 extending from the second end engagement portion, and an end cylindrical portion 169 extending from the first cylindrical portion. In at least one embodiment, first end engagement portion of first end assembly 160 may be engaged to the rotatable shaft 29 proximate to first cylindrical proportion 164. In one or more embodiments, end cylindrical portion 168 may be operatively engaged to a motor 172 or engine capable of imparting rotation (e.g., high-speed rotation) to rotatable shaft 29 and the one or more paddle assemblies 100 engaged therewith to mix the reinforcement fibers and cementitious slurry. In at least one embodiment, second end engagement portion of second end assembly 162 may be engaged to a second end (e.g., an end opposing the first end) of rotatable shaft 29 proximate to first cylindrical portion 165. In one or more embodiments, end cylindrical portion 169 of second end assembly 162 may be preferably engaged to a bearing assembly, which may be integral to an exterior wall of the horizontal fiber-cementitious slurry mixer 32, to permit the rotation of rotatable shaft 29.

As seen in FIG. 4A, a plurality of paddle assemblies 100 may be permanently and/or removably engaged (e.g., affixed, adhered, connected, etc.) to rotatable shaft 29 and configured into, for example, aligned rows and/or columns (e.g., rows along the length of the rotatable shaft 29, columns around the circumference of the rotatable shaft 29. In one or more embodiments, paddle assemblies 100 may be permanently or releasably engaged to rotatable shaft 29 in offset rows or columns as desired. In addition, rotating shaft 29 may accommodate any arrangement or configuration of paddle assemblies 100 as desired, preferably but not limited to spiral and/or helical configurations.

The rotatable shaft 29, in one or more embodiments, may be constructed to rotate at a predetermined rate 30 to 450 RPM, more preferably 40 to 300 RPM, and most preferably 50 to 250 RPM during mixing Paddle pin 114 has a width W1 which is less than a width W2 of paddle head 116 (See FIG. 4B). Pin 114 of mixing and conveying paddle 100 may include a threaded end portion 115 (See FIG. 4B) adapted for engagement into a threaded opening of the rotatable shaft 29, such that mixing and conveying paddle 100 may be rotated to achieve a desired or selected pitch (e.g., angle) relative to the rotatable shaft 29. In one or more embodiments, each mixing and conveying paddle 100 may be rotated a desired distance into the rotatable shaft 29, wherein the distance may be the same or different from one or more other paddle assemblies or sections of paddle assembles as engaged to the rotatable shaft 29. The paddles may be attached to the central shaft using different means including threaded attachment (as shown) and/or welding attachment (not shown).

FIG. 4E shows a configuration (schematically shown in FIG. 3B) of a dual-shaft (one shaft shown) multi-stage continuous fiber-slurry mixer 32 in which the first mixing section 22 has paddles 100 and the second mixing section 24 has augers 29A followed by paddles 100 on both shafts 29.

Figure 4D:
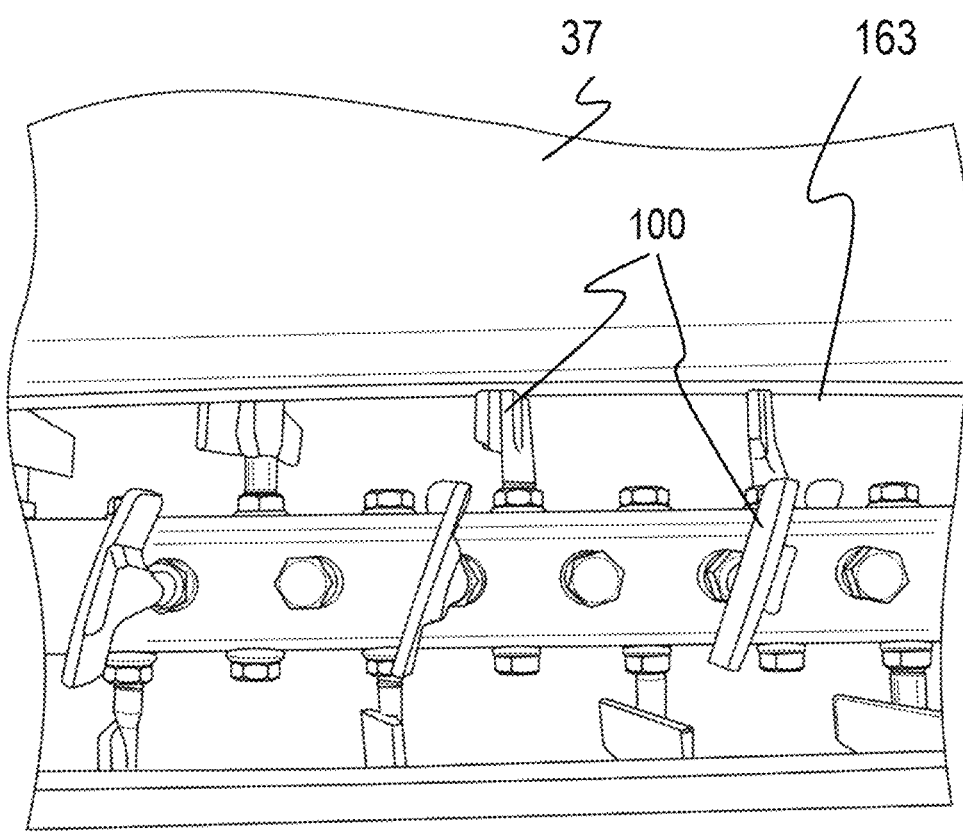
FIG. 4D provides a close-up view of the mixer with a door to the mixing chamber of the present fiber-slurry mixing device of FIG. 4A open showing the orientation of the paddles (with a pin and a head) with respect to the central shaft (one shaft shown for clarity).
Figure 4F:
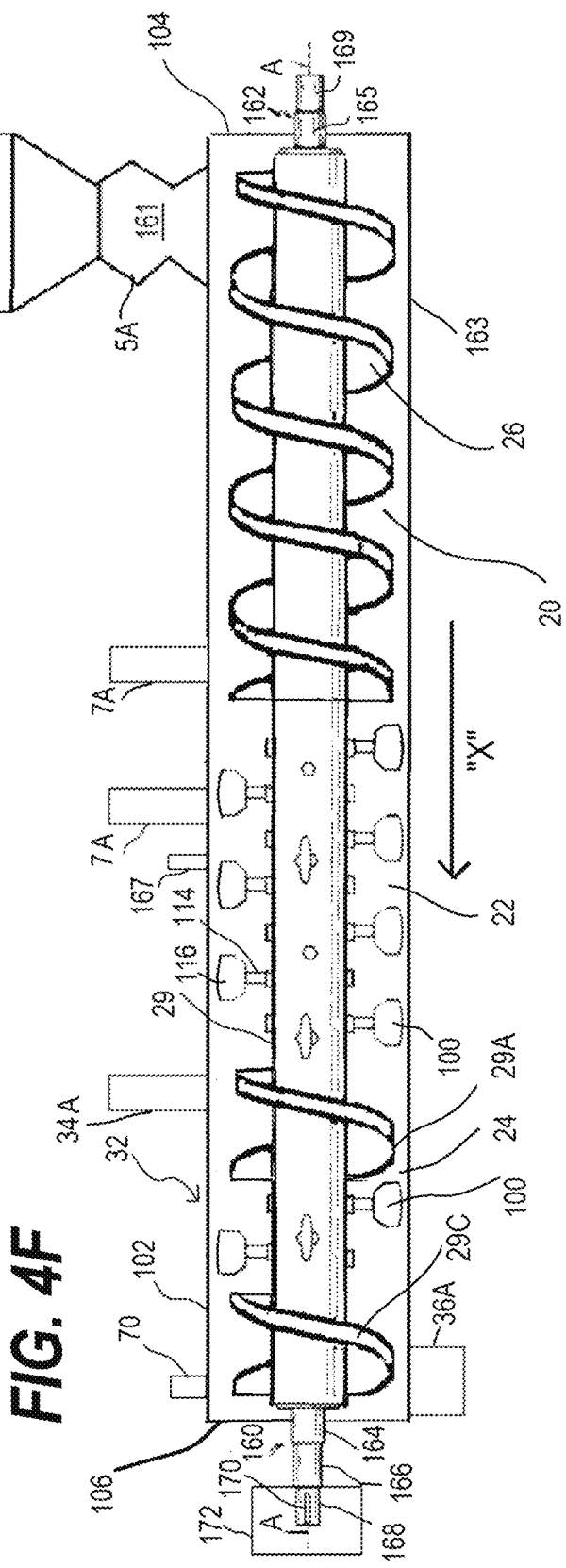
FIG. 4F shows a configuration of a dual-shaft (one shaft shown) multi-stage continuous fiber-slurry mixer (schematically shown in FIG. 3C) in which the first mixing section has paddles and the second mixing section has an auger followed by paddle/s followed by an auger on both shafts (one shaft shown for clarity).

FIG. 4F shows a configuration (schematically shown in FIG. 3C) of a dual-shaft (one shaft shown) multi-stage continuous fiber-slurry mixer 32 in which augers 26 are mounted on both impeller shafts 29 in the feed section 20, the first mixing section 22 has paddles 100 and the second mixing section 24 has an auger 29A followed by paddles 100 followed by an auger 29C on both shafts 29.

FIG. 4G shows a configuration (schematically shown in FIG. 3C) of a dual-shaft (one shaft shown) multi-stage continuous fiber-slurry mixer 32 in which augers 26 are mounted on both impeller shafts 29 in the feed section 20, the first mixing section 22 has paddles 100 and the second mixing section 24 has the auger 29A followed by pin/s 114 followed by the auger 29C on both shafts 29.

Figure 4H:
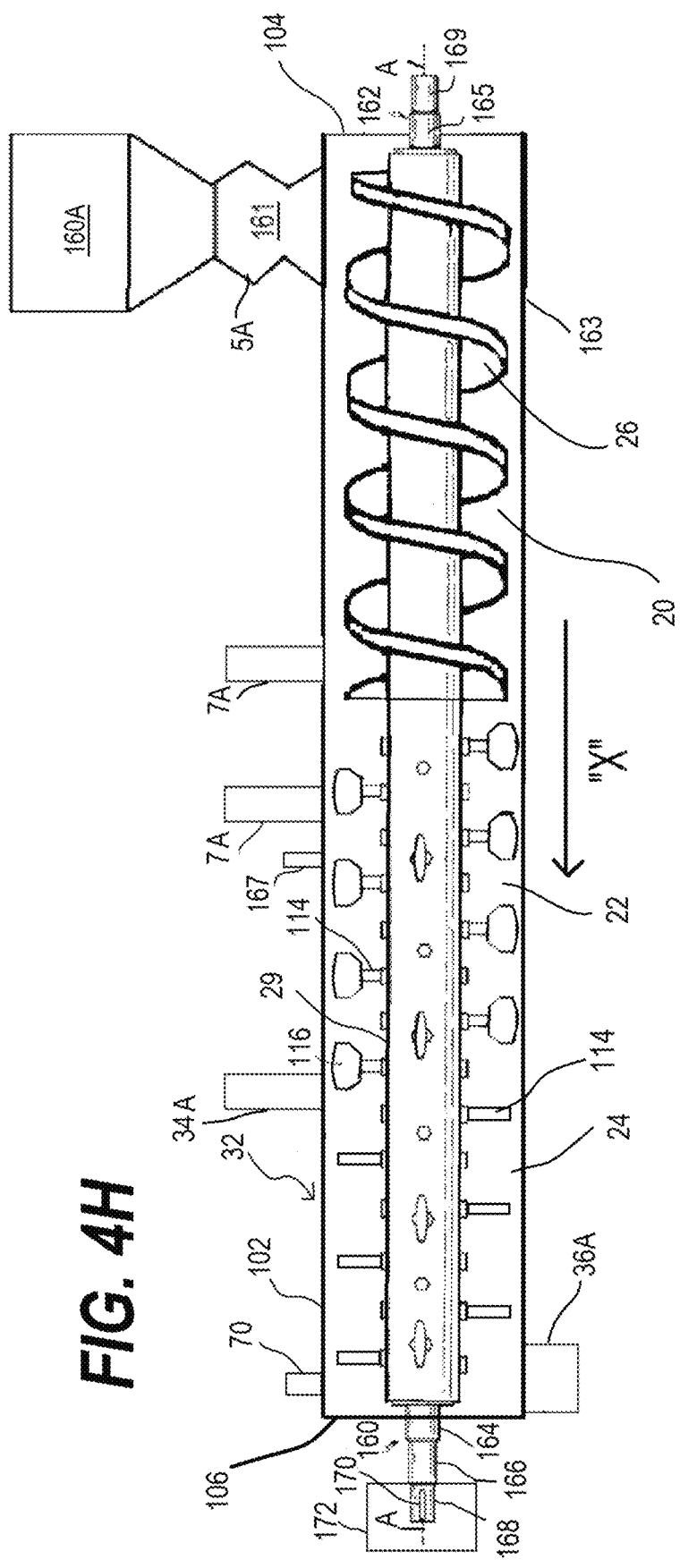
FIG. 4H shows a configuration (schematically shown in FIG. 3D) of a horizontal dual-shaft (one shaft shown) multi-stage continuous fiber-slurry mixer of the present invention in which the first mixing section has paddles and the second mixing section has only pins on both shafts.

FIG. 4H shows a configuration (schematically shown in FIG. 3D) of the horizontal dual-shaft (one shaft shown) multi-stage continuous fiber-slurry mixer 32 in which augers 26 are mounted on both impeller shafts 29 in the feed section 20, the first mixing section 22 has paddles 100 and second mixing section 24 has only pins 114 on both shafts 29.

FIG. 4I shows a configuration (schematically shown in FIG. 3A) having a dual-shaft (one shaft shown) multi-stage continuous fiber-slurry mixer 32 of the present invention in which augers 26 are mounted on both impeller shafts 29 in the feed section 20, the first mixing section 22 has paddles 25, 27 and the second mixing section 24 has augers 29A on both shafts), wherein the paddles are flat paddles 25 and/or helical paddles 27.

FIG. 4J shows a diagrammatic elevational side view of the configuration (schematically shown in FIG. 3B) having a dual-shaft (one shaft shown) multi-stage continuous fiber-slurry mixer of the present invention in which augers 26 are mounted on both impeller shafts 29 in the feed section 20, the first mixing section 22 has paddles 25, 27 and the second mixing section 24 has augers 29A followed by paddles 25, 27 on both shafts, wherein the paddles are flat paddles 25 and/or helical paddles 27. The empty space 25A between paddles where the shaft 29 is visible is intended to convey presence of paddles. In this mixer configuration, the adjacent paddles of the second mixing section on a shaft may be rotated with respect to each other or they may have a zero degree rotation with respect to each other, i.e. the paddles are uniformly aligned with respect to each other.

Figure 4K:
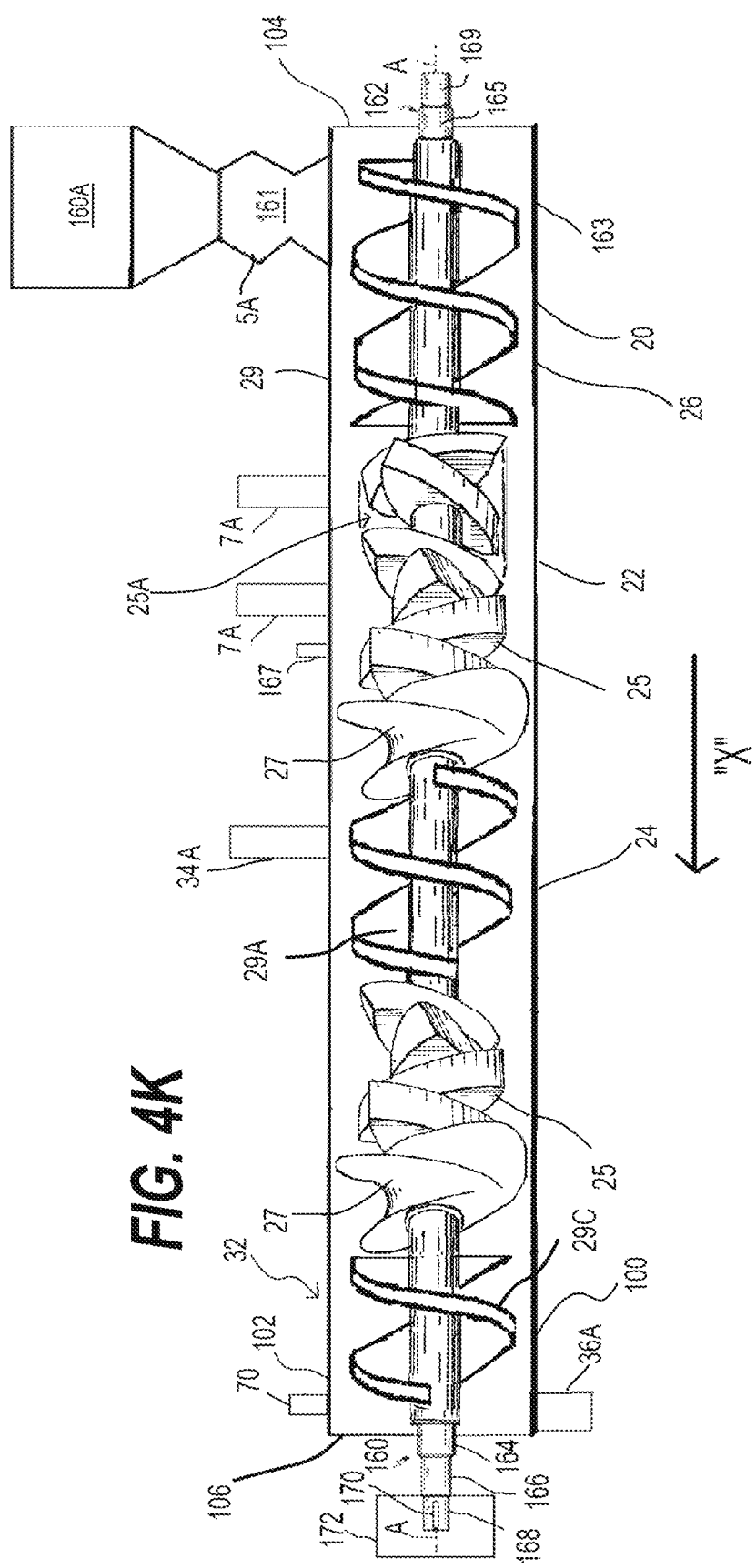
FIG. 4K shows a configuration (schematically shown in FIG. 3C) in which the first mixing section has flat paddle's and/or helical paddle/s and the second mixing section has an auger followed by flat paddle's and/or helical paddle/s followed by an auger on both shafts (one shaft shown for clarity), wherein the paddles are flat paddles or helical paddles; the empty space between paddles where the shaft is visible is intended to convey presence of paddles.

FIG. 4K shows a configuration (schematically shown in FIG. 3C) in which augers 26 are mounted on both impeller shafts 29 in the feed section 20, the first mixing section 22 has flat paddles 25 and/or helical paddles 27 and the second mixing section has an auger 29A followed by flat paddles 25 and/or helical paddles 27 followed by an auger 29C on both shafts (one shaft shown for clarity). The empty space 25A between paddles where the shaft 29 is visible is intended to convey presence of paddles.

Figure 4M:
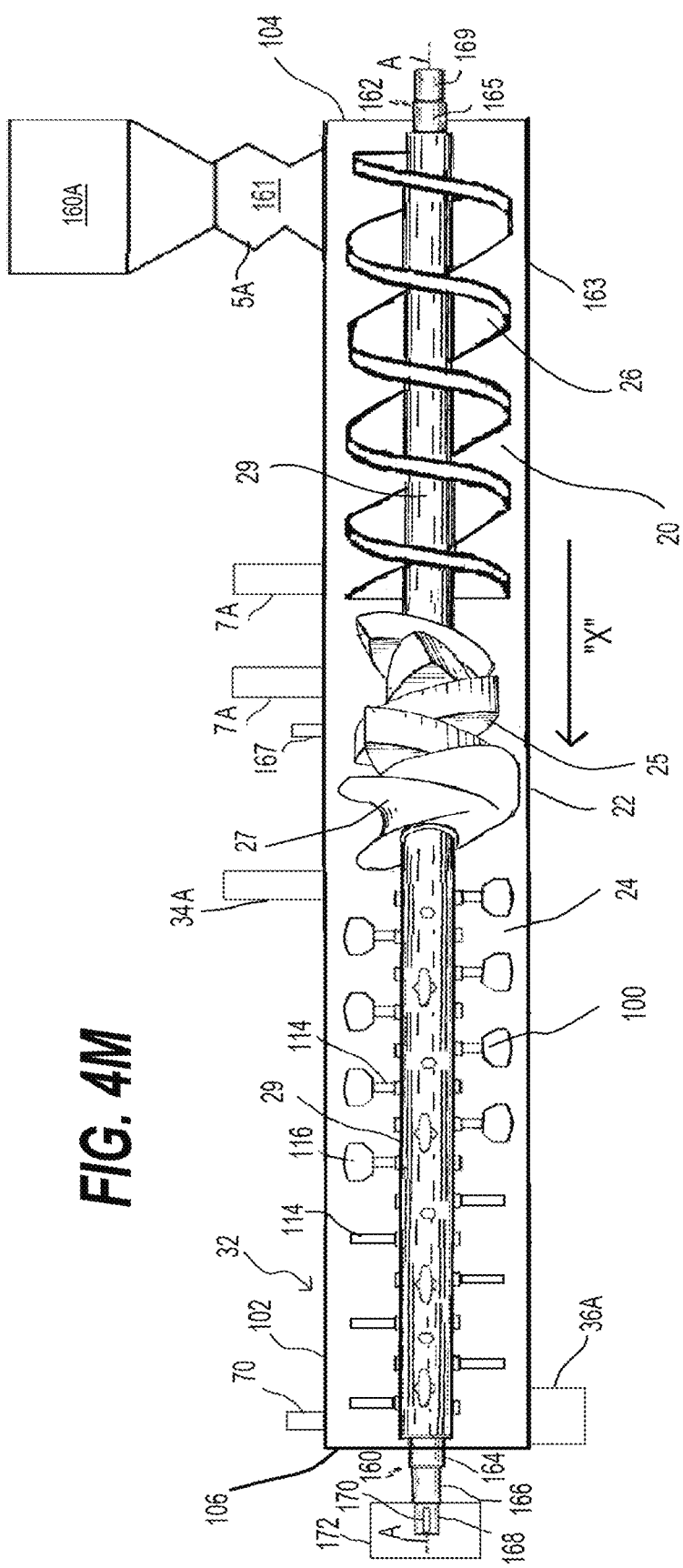
FIG. 4M shows a variation of the configuration (schematically shown in FIG. 3D) having a dual-shaft (one shaft shown) multi-stage continuous fiber-slurry mixer of the present invention in which first mixing section can have one type of paddles and the second mixing section can have a different type of paddles; the preferred arrangement in this configuration is to have flat paddles and/or helical paddles in the first mixing section and paddles with a pin and a head and/or only pins, in the second mixing section 24.

FIG. 4L shows a configuration (schematically shown in FIG. 3D) having a dual-shaft (one shaft shown) multi-stage continuous fiber-slurry mixer 32 of the present invention in which augers 26 are mounted on both impeller shafts 29 in the feed section 20, the first mixing section 22 has paddles and the second mixing section 24 has paddles on both shafts 29, wherein the paddles are flat paddles 25 or helical paddles 27. The empty space 25A where the shaft 29 is visible is intended to convey presence of paddles. In this mixer configuration, it is preferred that the adjacent paddles of the second mixing section on a shaft have a zero degree rotation with respect to each other, i.e. the paddles are uniformly aligned with respect to each other, FIG. 4M shows a variation of the configuration (schematically shown in FIG. 3A) having a dual-shaft (one shaft shown) multi-stage continuous fiber-slurry mixer 32 of the present invention in which augers 26 are mounted on both impeller shafts 29 in the feed section 20, first mixing section 22 can have one type of paddles and the second mixing section 24 can have a different type of paddles. The preferred arrangement in this configuration is to have flat paddles 25 and/or helical 27 paddles in the first mixing section 22 and paddles 100 with a pin 114 and a head 116 and/or only pins 114, in the second mixing section 24. Most preferably the paddles in the first mixing section are flat or helical, and paddles in the second mixing section comprise paddles with a pin and a head and/or pins.

In the mixer configurations of the invention employing flat and/or helical paddles in the second mixing section, for example in the mixers of FIGS. 4I, 4J, 4K, 4L, and 4M, the flat paddles 25 and/or helical paddles 27 are on the shaft 29; and all adjacent flat and/or helical paddles on the shaft 29 in the second mixing section 24 have a 0 to 90 degree rotation with respect to each other.

If desired the flat and/or helical paddles are on the shaft in the second mixing section and all adjacent flat and/or helical paddles on the shaft in the second mixing section have a zero degree rotation with respect to each other.

If desired the flat and/or helical paddles are on the shaft in the second mixing section and all adjacent flat and/or helical paddles on the shaft in the second mixing section have a 30 degree rotation with respect to each other.

If desired the flat and/or helical paddles are on the shaft in the second mixing section and all adjacent flat and/or helical paddles on the shaft in the second mixing section have a 45 degree rotation with respect to each other.

If desired the flat and/or helical paddles are on the shaft in the second mixing section and all adjacent flat and/or helical paddles on the shaft in the second mixing section have a 60 degree rotation with respect to each other.

If desired the flat and/or helical paddles are on the shaft in the second mixing section and all adjacent flat and/or helical paddles on the shaft in the second mixing section have a 90 degree rotation with respect to each other.

The above mentioned features and parameters of the fiber-slurry continuous mixer of this invention are further described as follows. This applies not only to the embodiments of the drawings but the invention in general unless otherwise indicated.

Elongated Mixing Chamber

The elongated mixing chamber is typically cylindrical in shape. The length of the mixing chamber typically ranges anywhere from about 2 to 8 feet. The preferred length of the mixing chamber is from about 3 to 5 feet. The diameter of the mixing chamber typically ranges anywhere from about 4 to 24 inches. The preferred diameter of the mixing chamber ranges from about 6 to 12 inches.

Rotating Shafts

The diameter of each of the dual or multi-rotating shafts is typically from about 1 to 4 inches. The preferred diameter of the central shafts ranges from about 1 to 3 inches.

The central rotating shafts rotate at a speed, preferably ranging from about 30 to 450 RPM, more preferably 40 to 300 RPM, and most preferably 50 to 250 RPM. It has been discovered that relatively lower mixer speeds are preferable to meet the objectives of the present invention. It has been surprisingly found that excellent fiber dispersion in the cementitious slurry mixture can be obtained even at relatively low mixer speeds. Furthermore, another important benefit of using lower mixing speeds is that it results in reduced fiber breakage and superior material working and flow properties useful in further processing of the fiber reinforced cementitious slurry mixture.

A variable frequency drive is preferably used with the mixer for turning the central rotating shaft when the mixer is in operational mode. The variable frequency drive is helpful for adjusting and fine-tuning the mixer speed for a given combination of raw materials involved in the production process.

The continuous mixers of the present invention can either be a single-shaft mixer, a dual-shaft mixer, or a multi-shaft mixer. This disclosure describes the dual-shaft mixers of the present invention in greater detail. However, it is contemplated that single-shaft or multiple-shaft mixers in accordance to the present invention can also be beneficially employed for producing fiber reinforced cementitious slurry mixtures possessing desirable properties that are useful in a variety of applications including continuous production processes.

Mixing Paddles

The mixing paddles mounted on the central shaft can have different shapes and dimensions to facilitate mixing and conveying of the added components in the mixer.

As explained above the invention may employ flat paddles and helical paddles.

The mixing paddles suitable for use in the present invention also include paddles with a pin and a relatively wider head to help move the material forward, for example paddle 100. In addition to the paddles having one type of pin and head, the fiber-slurry mixer may include more than one type of paddle having a pin and a relatively wider head, or just pins, to achieve desirable characteristics required for further processing of the material. However, as seen in FIG. 4B the invention may employ a single style paddle in both the first mixing section 22 and second mixing section 24. However, use of flat or helical paddles is most preferred in the first mixing section of the fourth mixer configuration which has paddles in both the first mixing section 22 and the second mixing section 24. Further, use of paddles 100 with a pin 114 and a head 116 or only pins 114 is most preferred in the second mixing section 24 of the fourth mixer configuration. The use of the same type of paddles in both mixing sections is allowed in the fourth mixer configuration but is not preferred.

The overall dimensions of the paddles are such that the clearance (space) between the inner circumference of the mixer chamber and the paddle's furthermost point from the central shaft is preferably less than ¼", more preferably less than ⅛", and most preferably less than ¹⁄₁₆". Too great a distance between the paddle tips and the inner walls of the chamber would result in slurry build-up. Pins 114 can be substituted for at least some of the paddles 100. For example, the pins may be the pins 114 of the paddles 100 without the broad paddle head 116.

The quality of mixing and conveying of the components in the mixer is also dictated by the orientation of the paddles in the mixer. A parallel or perpendicular paddle orientation with respect to the cross-section of the central shaft diminishes the conveying action of the paddles thus increasing the residence time of the material in the mixer. An increased residence time of the material in the mixer can lead to significant fiber damage and production of fiber reinforced cementitious slurry mixture having undesirable characteristics. When employing paddles having pins and heads, for example paddle 100, the orientation of the longitudinal axis "LH" of the paddle head 116 with respect to the longitudinal axis "A" of the central shaft 118 is preferably at an angle "B" (FIG. 4C) from about 10° to 80°, more preferably from about 15° to 70°, and most preferably from about 20° to 60°. The use of preferred paddle orientation leads to a more efficient mixing and conveying action of the slurry mixture and causes minimal damage to the reinforcing fibers in the mixer.

FIG. 4D provides a close-up view of the mixer 32 with a door 37 to the mixing chamber 163 open showing the orientation of the paddles 100 with respect to the central shaft 29 (one shaft shown). Placement of the paddles 100 on the central shaft 118 in the spiral form can also be observed.

When employing paddles having pins and heads, for example paddle 100, the set of paddles in the mixer are typically configured in a spiral form on the central shaft from one end of the mixer to another. This arrangement of paddles further facilitates conveying action of the material inside the mixer. Other configurations of paddle arrangement in the mixer are possible and are contemplated as part of this invention.

The paddles can be made of variety of materials including metals, ceramics, plastics, rubber, or a combination thereof. Paddles with softer lining (coating) materials are also contemplated as they tend to minimize material and fiber breakage.

The paddles and/or inner walls of the elongated mixing chamber may be coated with a release material, to minimize buildup of the cementitious slurry on the paddles and/or shell.

Other Configurations:

Other combinations of augers and mixing/conveying paddles to achieve the objectives of this invention are possible and contemplated as part of this invention. When employing paddles having pins and heads, for example paddle 100, these types of paddles may be used on their own in the first mixing section 22 and second mixing section 24 as described above and shown in FIG. 4B or they may be used in combination with augers. For example, paddles having pins and heads, for example paddle 100, may be employed to substitute for the paddles 29B in FIGS. 3B-3C.

Inlet Ports

The inlet conduits 5A, 7A, 34A for the raw materials, such as the dry cementitious powder, aqueous liquid medium, and fibers fees into the mixer at inlet ports of the mixing chamber. The size, location, and orientation of raw material inlets ports of the fiber-slurry mixer are configured to ease introduction of the raw material into the mixer and to minimize potential for blocking of ports from the slurry mixture in the mixer.

The continuous fiber-slurry mixer has at least one inlet port to introduce dry powders into the mixing chamber. This inlet port is located at the beginning of the first feed section (auger section) of the continuous fiber-slurry mixer.

The continuous fiber-slurry mixer has at least one inlet port to introduce aqueous medium comprising water into the mixing chamber. The water inlet port is typically located at the end of the first feed section (auger section) of the continuous fiber-slurry mixer. The continuous fiber-slurry mixer can have additional inlet ports to introduce other performance enhancing additives into the mixing chamber. These inlet ports are typically located at the end of the auger section or the beginning of the first mixing section of the co continuous fiber-slurry.

The continuous fiber-slurry mixer has at least one inlet port to introduce reinforcing fibers into the mixing chamber. The fiber inlet port is typically located at the beginning of the second mixing section of the continuous fiber-slurry mixer. The fibers can be introduced into the continuous fiber-slurry mixer gravimetrically or volumetrically using a variety of metering equipment such as screw feeders or vibratory feeders. Fibers can be conveyed from a fiber feeder to the fiber-slurry mixer by a variety of conveying devices. For example, fibers can be transferred using screws (augers), air conveying, or simple gravity deposition. The discrete or chopped fibers can be made of different reinforcing fiber materials including fiberglass; polymeric materials such as polypropylene, polyethylene, polyvinyl alcohol, etc; carbon; graphite; aramid; ceramic; steel; cellulosic, paper, or natural fibers such as jute or sisal; or a combination thereof. Preferably the fibers are fiberglass. The fiber length is about 2 inches or lower, more preferably 1.5 inches or lower and most preferably 0.75 inches or lower.

The continuous fiber-slurry mixer has an outlet port to discharge the fiber reinforced cementitious slurry mixture produced by the continuous fiber-slurry mixer. The outlet port is located at the end of the second mixing section of the continuous fiber-slurry mixer.

The mixer has a venting port to remove any air introduced into the mixing chamber from raw material feed.

An electrical motor and drive mechanism to drive the shafts are associated with the mixing chamber.

Panel Production

Fiber reinforced cementitious slurry made using this mixer can be used for a variety of other applications. One of the uses of the fiber-slurry mixture is in panel production. In particular, production of fiber reinforced structural concrete panels is one preferred use.

Figure 5:
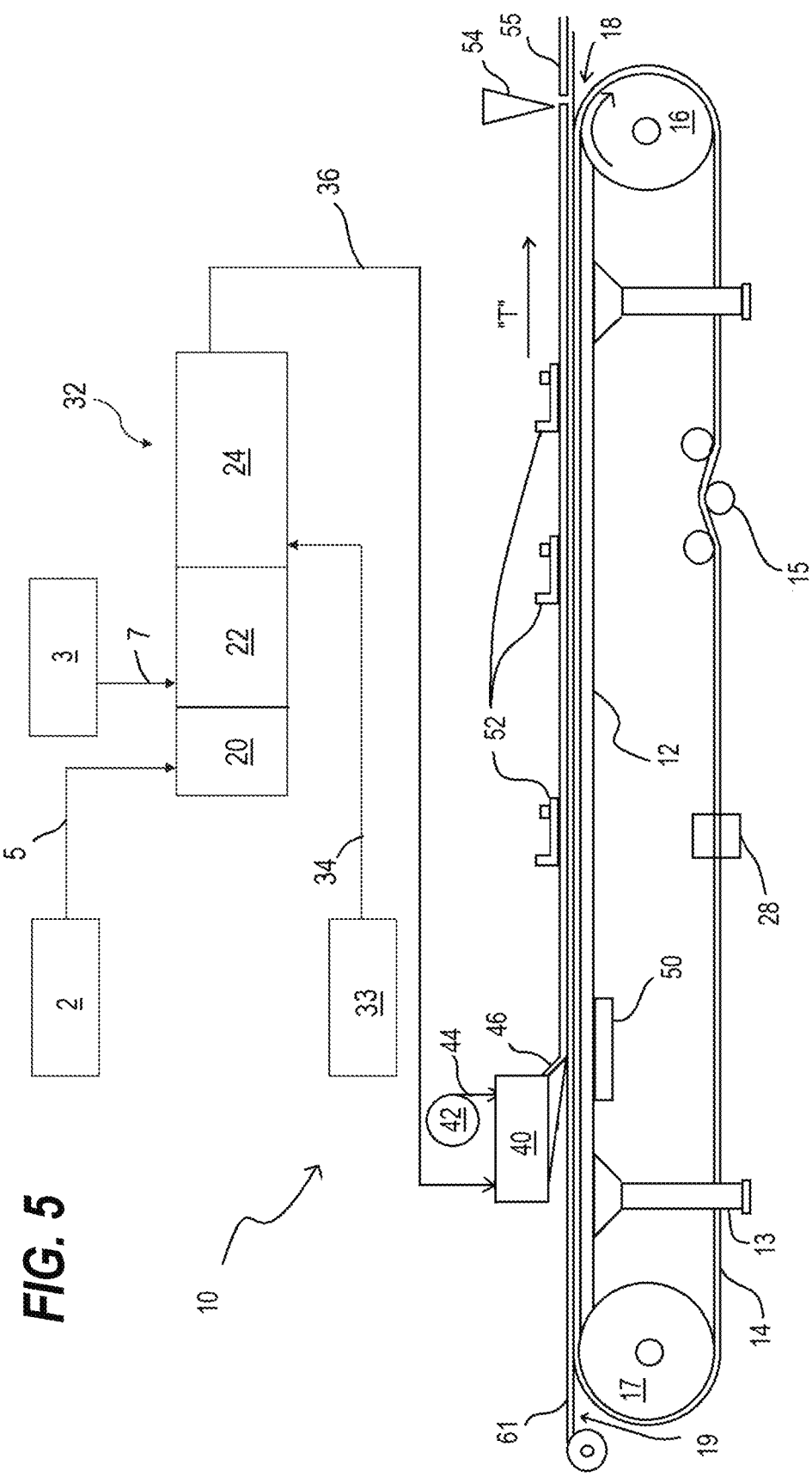
FIG. 5 shows a diagrammatic elevational view of a cementitious panel production line suitable for use with the present fiber-slurry mixing device.

Referring now to FIGS. 5 and 6, a cementitious panel production line for producing fiber reinforced concrete (FRC) panels is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 17 at a proximal end 19 of the frame. Also, at least one belt tracking and/or tensioning device 15 is typically provided for maintaining a desired tension and positioning of the carrier 14 upon the rolls 16, 17. In this embodiment, the cementitious panels (FRC panels) are produced continuously as the moving carrier proceeds in a direction "T" from the proximal end 19 to the distal end 18.

In this embodiment, a web 61 of release paper, polymer film or a plastic carrier, or nonwoven fiber mats for supporting a slurry prior to setting, may be provided and laid upon the carrier 14 to protect it and/or keep it clean. However, it is also contemplated that, rather than the continuous web 61, individual sheets (not shown) of a relatively rigid material, e.g., sheets of polymer plastic, may be placed on the carrier 14. These carrier films or sheets may be removed from the produced panels at the end of the line or they may be incorporated as a permanent feature in the panel as part of the overall composite design. When these films or sheets are incorporated as a permanent feature in the panel they may provide enhanced attributes to the panel including improved aesthetics, enhanced tensile and flexural strengths, enhanced impact and blast resistance, enhanced environmental durability such as resistance to water and water vapor transmission, freeze-thaw resistance, salt-scaling resistance, and chemical resistance.

Optionally a layer of discrete reinforcing fibers (not shown) may be deposited directly on the conveying belt (carrier), release paper, or forming sheet upstream of the headbox 40.

In this embodiment, continuous reinforcement 44 such as a roving or a web of reinforcing scrim such as fiberglass scrim or a nonwoven fiber mat such as nonwoven fiberglass mat or a nonwoven polypropylene mat may be provided for embedding in the slurry prior to setting and reinforcing the resulting cementitious panels. The continuous rovings and/or reinforcing scrim roll 42 are fed through the headbox 40 to be laid upon the carrier 14. However, it is also contemplated that, the continuous reinforcement 44 not be employed. The continuous scrim, nonwoven fabric, or rovings can be made of different reinforcing fiber materials including fiberglass; polymeric materials such as polypropylene, polyethylene, polyvinyl alcohol, etc.; carbon; graphite; aramid; ceramic; steel; cellulosic or natural fibers such as jute or sisal; or a combination thereof. A roving is an assemblage of continuous reinforcing monofilaments. Scrim is a web of continuous fibers running in the machine direction and the cross-direction. Reinforcement may also be provided as a non-woven web made of discrete reinforcement fibers.

It is also contemplated that the cementitious panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

The present production line 10 includes the continuous multi-stage fiber-slurry mixer 32 described above. The fiber-slurry mixer 32 may be a dual shaft or multi-shaft mixer. Dry powder feeder 2 feeds dry components 5 of the cementitious composition, except for reinforcing fibers, to the feed section 20 of the multi-stage continuous slurry mixer 32. Liquid pump 3 feeds aqueous medium 7, such as water, with liquid or water soluble additives to the first mixing section 22 of the mixer 32. The first mixing section 22 of the multi-stage continuous mixer 32 mixes the dry components and the aqueous medium to form a cementitious slurry. The cementitious slurry feeds the second mixing section 24 of the mixer 32. Also, fiber feeder 33 feeds fibers 34 to the fiber-slurry mixer 32. Thus, in the second mixing section 24 of the mixer 32 the fibers and cementitious slurry are mixed to form a fiber-slurry mixture 36. The fiber-slurry mixture 36 feeds a headbox 40.

Headbox 40 (or other type of slurry distributor) deposits the fiber-slurry mixture on the web 26 of release paper (if present) traveling on the moving carrier 14. Continuous reinforcement in form of rovings or scrim or nonwoven fabric may be deposited on either one or both surface of the panel. If desired, continuous reinforcement 44 provided by fiber rovings or spools and/or scrim roll 42 is also passed through the headbox 40 as shown in FIG. 6 to deposit on top of the deposited fiber-slurry mixture 46. To assist in leveling the fiber-slurry mixture 46 a forming vibrating plate 50 may be provided under or slightly downstream of the location where the headbox 40 deposits the fiber-slurry mixture 46.

The fiber-slurry mixture 46 sets as it travels along the moving carrier 14. To assist in leveling the fiber-slurry mixture 46 as it is setting the fiber-slurry mixture 46 passes under one or more vibrating screed plates 52. At the distal end 18 of the support frame 12 a cutter 54 cuts the set fiber-slurry mixture into boards 55. The boards (panels) 55 are then placed on an unloading and curing rack 57 (See FIG. 6) and allowed to cure.

Optionally, rather than applying scrim or rovings or nonwoven fabric 44 from roll 42 to the top of the deposited fiber-slurry mixture 46, discrete reinforcing fibers (not shown) may be deposited on the surface of the fiber-slurry mixture 46 between the headbox 40 and the first screed plate 52. The deposited fibers are then embedded by the screed plates 52. Such bottom continuous reinforcement, if desired, is fed behind the headbox 40 and it rests directly on top of the conveying/forming belt. The bottom continuous reinforcement passes under the headbox and the slurry in the headbox 40 is poured directly on its top as the continuous reinforcement moves forward. For example, continuous reinforcement can be provided by web 26 or a roll (not shown) upstream to the headbox in addition to that providing web 26 to lay the continuous reinforcement above web 26.

FIG. 6 further shows edge formation and leakage prevention devices 80. These are edge belts or edge rails (used singly or in combination).

The fiber-cement mixtures produced by this invention contain cement, water, and other cement additives. However, to achieve the desired viscosity the cementitious compositions preferably avoid thickeners or other high viscosity processing aids at high dosage rates as commonly used with fiber cement extrusion. For example, the present slurries preferably avoid high viscosity cellulose ethers at high dosage rates. Examples of high viscosity cellulose ethers which the present slurries avoid are methyl cellulose, hydroxypropyl methyl cellulose, and hydroxyethyl methylcellulose.

The fiber-cement mixtures produced by this invention are aqueous slurries which may be made by adding fibers to a variety of settable cementitious slurries. For example, compositions based on hydraulic cements or based on gypsum. ASTM defines "hydraulic cement" as follows: a cement that sets and hardens by chemical interaction with water and is capable of doing so under water. Examples of suitable hydraulic cements are Portland cement, calcium aluminate cements (CAC), calcium sulfoaluminate cements (CSA), geopolymers, magnesium oxychloride cements (sorel cements), and magnesium phosphate cements. A preferred geopolymer is based on chemical activation of Class C fly ash.

While calcium sulfate hemihydrate (gypsum) sets and hardens by chemical interaction with water, it is not included within the broad definition of hydraulic cements in the context of this invention. However, calcium sulfate hemihydrate may be included in fiber-cement mixtures produced using this invention. Thus, also such aqueous slurries may be based on calcium sulfate cements such as gypsum cements or plaster of Paris. Gypsum cements are primarily calcined gypsum (calcium sulfate hemihydrate). It is customary in the industry to term calcined gypsum cements as gypsum cements.

The fiber-cement mixtures contain sufficient water to achieve the desired slump test value and viscosity in combination with the other ingredients of the fiber-cement mixtures. If desired the composition may have a weight ratio of water-to-reactive powder of 0.20/1 to 0.90/1, preferably 0.20/1 to 0.70/1.

The fiber-cement mixtures may contain pozzolanic material such as silica fume, a finely divided amorphous silica which is the product of silicon metal and ferro-silicon alloy manufacture. Characteristically, it has very high silica content and low alumina content. Various other natural and man-made materials have been referred to as having pozzolanic properties, including pumice, perlite, diatomaceous earth, tuff, trass, metakaolin, microsilica, and ground granulated blast furnace slag. Fly ash also has pozzolanic properties. The fiber-cement mixtures may contain Ceramic microspheres and/or Polymer microspheres.

However, one preferred use of the fiber-cement slurries made by the present method is to produce FRC panels suitable as structural cement panels (SCP panels) having reinforcing fibers such as fiberglass, particularly alkali resistant glass fibers. As such, the cementitious slurry is preferably comprised of varying amounts of Portland cement, gypsum, aggregate, water, accelerators, plasticizers, superplasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

Water reducing admixture additives optionally can be included in the fiber-cement mixture, such as, for example, plasticizers and superplasticizers and dispersants, to improve the fluidity of a hydraulic slurry. Such additives disperse the molecules in solution so they move more easily relative to each other, thereby improving the flowability of the entire slurry. Sulfonated melamines and sulfonated naphthalenes, and polycarboxylate based superplasticizers can be used as superplasticizers. Water reducing admixture additive can be present in an amount from 0% to 5%, preferably 0.5 to 5%, by weight of the wet finish fiber-slurry mixture.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.2/1 to 0.7/1.

Various formulations for the composite slurry used in the current process are also shown in published US applications US2006/0185267, US2006/0174572, US2006/0168905 and US 2006/0144005, all of which are incorporated herein by reference in their entirety. A typical formulation would comprise as the reactive powder, on a dry basis, 35 to 75 wt. % (typically 45-65 or 55 to 65 wt. %) calcium sulfate alpha hemihydrate, 20 to 55 wt. % (typically 25-40 wt. %) hydraulic cement such as Portland cement, 0.2 to 3.5 wt. % lime, and 5 to 25 wt. % (typically 10-15 wt. %) of an active pozzolan. The continuous phase of the panel would be uniformly reinforced with alkali-resistant glass fibers and would contain 20-50% by weight of uniformly distributed lightweight filler particles selected from the group consisting of ceramic microspheres, glass microspheres, fly ash cenospheres and perlite. An example of a formulation for the composite slurry includes from 42 to 68 wt. % reactive powders, 23 to 43 wt. % ceramic microspheres, 0.2 to 1.0 wt. % polymer microspheres, and 5 to 15 wt. % alkali-resistant glass fibers, based on the total dry ingredients.

U.S. Pat. No. 8,038,790 to Dubey et al, incorporated herein by reference, provides another example of a preferred formulation for the composite slurry which includes an aqueous mixture of a cementitious composition comprising, on a dry basis, 50 to 95 wt % reactive powder, 1 to 20 wt % of coated hydrophobic expanded perlite particles uniformly distributed as lightweight filler therein, the coated hydrophobic perlite particles having a diameter in the range of about 1 to 500 microns (micrometers), a median diameter of 20 to 150 microns (micrometers) and an effective particle density (specific gravity) of less than about 0.50 g/cc, 0 to 25 wt % hollow ceramic microspheres, and 3 to 16 wt. % alkali-resistant glass fibers for uniformly distributed for reinforcement; wherein the reactive powder comprises: 25 to 75 wt. % calcium sulfate alpha hemihydrate, 10 to 75 wt. % hydraulic cement comprising Portland cement, 0 to 3.5 wt. % lime, and 5 to 30 wt. % of an active pozzolan; and the panel having a density of 50 to 100 pounds per cubic foot.

Although the above compositions for the composite fiber-slurry mixture are preferred, the relative amounts of these ingredients, including the elimination of some of the above or the addition of others, may vary to suit the intended use of the final product.

Slurry Feed Apparatus (Headbox)

Referring now to FIG. 5 a fiber-slurry feeder (also known as a fiber-slurry headbox 40) receives a supply of fiber-slurry mixture 36 from the fiber-slurry mixer 32.

The headbox 40 is disposed transversely to the direction of travel "T" of the carrier 14. The fiber-slurry mixture 36 is deposited in a cavity of the headbox 40 and discharges as fiber-slurry mixture stream 46 through a discharge opening of the headbox 40 onto the moving carrier web 14 (conveyor belt).

The fiber reinforced cementitious slurry can be pumped through a hose and hose oscillator system into the headbox 40 or it may be dropped via gravity into the headbox 40 directly from the fiber-slurry mixer 32. The oscillator system would be used in either case to agitate the slurry. Thickness of the product formed using the headbox 40 is controlled by the slurry flow rate in the headbox 40, the amount of slurry elevation head in the headbox 40, and headbox discharge opening gap for a given line speed. The discharge opening gap of the headbox 40 is a transverse opening through which the fiber-slurry mixture discharges from the headbox 40 onto the moving carrier web 14. The fiber-slurry mixture from the headbox deposits onto the moving carrier 14 in one step at close to the desired thickness and finish of the final panel 55. Vibration may be added to improve formation. Also, different forms of continuous reinforcements such as scrims and rovings may be added to improve flexural strength of the formed product. For example, a vibration unit 50 may be located below the headbox 40 under the conveyor belt 14.

The vibration unit 50 is typically a single mass system of a table, springs, and two motors which direct forces directly into the deposited mat of fiber-cement slurry and cancel out in other directions. This unit 50 is placed under the headbox 40 and it extends about 3 to 6 inches beyond the head box.

The headbox 40 deposits an even layer of the fiber-slurry mixture 46 of relatively controlled thickness upon the moving carrier web 14. Suitable layer thicknesses range from about 0.25 inch to 2 inches, preferably 0.4 to 0.8 inches thick.

The fiber-slurry mixture 46 is completely deposited as a continuous sheet of slurry uniformly directed down to within a distance of about 1.0 to about 1.5 inches (2.54 to 3.81 cm.) of the carrier web 14.

As the fiber-slurry mixture 46 moves toward the moving carrier web 14, it is important that all of the slurry be deposited on the carrier web 14.

Forming and Smoothing and Cutting

Upon the disposition of the layer of fiber-embedded settable slurry as described above, the frame 12 may have forming devices provided to shape an upper surface of the setting slurry-fiber mixture 46 traveling on the belt 14.

In addition to the above-mentioned vibrating table (forming and vibrating plate) 50 that assists to smooth the slurry being deposited by the headbox 40, the production line 10 may include smoothing devices, also termed vibrating screed plates 52, to gently smooth the upper surface of the panel (see FIGS. 5 and 6).

By applying vibration to the slurry 46, the smoothing device 144 facilitates the distribution of the fibers 34 throughout the panel 55, and provides a more uniform upper surface. The smoothing device 144 may either be pivoted or rigidly mounted to the forming line frame assembly.

After smoothing, the layer of slurry has begun to set, and the respective panels 55 are separated from each other by a cutting device 54, which in a typical embodiment is a water jet cutter. The cutting device 54 is disposed relative to the line 10 and the frame 12 so panels are produced having a desired length. When the speed of the carrier web 14 is relatively slow, the cutting device 54 may be mounted to cut perpendicularly to the direction of travel of the web 14. With faster production speeds, such cutting devices are known to be mounted to the production line 10 on an angle to the direction of web travel. Upon cutting, the separated panels 55 are stacked for further handling, packaging, storage and/or shipment as is well known in the art.

Another feature of the present invention is that the resulting cementitious panel (FRC panel) 55 is constructed so the fibers 34 are uniformly distributed throughout the panel. This has been found to enable the production of relatively stronger panels with relatively less, more efficient use of fibers. The volume fraction of fibers relative to the volume of slurry in the layer of the fiber-slurry mixture preferably constitutes approximately in the range of 1% to 5% by volume, preferably 1.5% to 3% by volume, of the fiber-slurry mixture 46. Also, the entire final thickness of the panel is applied as a single layer in the form of fiber-slurry mixture to facilitate manufacturing of the panels 55.

Variations of the Production Line

FIG. 7 shows a composite view of a production line 110 which is a first variation of a process flow chart for the portion of the cementitious panel production line suitable for use with the present fiber-slurry mixing device upstream of the headbox and a top view of the production line downstream of the headbox. This adds a slurry accumulator and positive displacement pump 30.

FIG. 8 shows a composite view of a production line 210 which is a second variation of a process flow chart for the portion of the cementitious panel production line suitable for use with the present fiber-slurry mixing device upstream of the headbox and a top view of the production line downstream of the headbox. This adds fiber roving choppers 40A.

It is contemplated that the fiber-slurry mixer 32 and fiber-slurry mixture 36 in these embodiments, and other like numbered elements shown are the same as used in the production line 10 of FIG. 5 and FIG. 6.

Although, FIGS. 5-8 show process flow diagrams for a manufacturing process that utilizes the fiber-slurry mixer of this invention for producing fiber reinforced cementitious panels. Other uses and applications of the fiber-slurry mixer of this invention are possible and contemplated as part of this disclosure.

The fiber reinforced cementitious slurry mixtures produced using the multi-stage continuous mixer of the present invention are particularly useful in a variety of civil engineering and construction applications. More specifically, the fiber reinforced cementitious slurry mixtures produced using the multi-stage continuous mixer of the present invention are particularly useful for producing a variety of fiber reinforced cementitious products using continuous manufacturing processes. Selected examples of fiber reinforced cementitious products that can be produced utilizing the material from the multi-stage continuous mixer of the present invention are highlighted as follows:

Structural Subfloor Panels
Structural Roof Sheathing Panels
Structural Wall Sheathing Panels
Structural Foundation Wall Panels
Permanent Formwork Panels
Roof Cover Board
Impact and Blast Resistant Panels
Exterior Siding Panels and Trims
Exterior Façade & Architectural Panels
Architectural Ceiling Panels
Roofing Tiles
Tile Backerboard
Synthetic Stone, Bricks and Tiles
Countertops
Furniture
Prefabricated Wall Assemblies, Floor and Floor-Ceiling Assemblies, and Roof Assemblies
An Alternative Product to Plywood, Oriented-Strand Board, and Low-, Medium- and High-Density Fiber Boards in Various Applications
Access Floor Panels
Other Uses While a particular embodiment of the present slurry feed invention for fiber-reinforced structural cementitious panel production has been shown and described, it will be appreciated by those skilled in the art that changes and modifications may be made thereto without departing from the invention in its broader aspects and as set forth in the following claims.

What is claimed is:

1. A continuous method for preparing cement composite slurry comprising the steps of:
   feeding a dry cementitious powder into a horizontal continuous slurry mixer through at least one dry cementitious powder inlet port;
   the horizontal continuous mixer comprising
      an horizontally oriented elongated mixing chamber, the elongated mixing chamber defined by a horizontal housing having an interior side wall, upstream first end wall, downstream second end wall, the elongated mixing chamber having an upstream end feed section beginning at the upstream first end wall, a first mixing section, and a second downstream end mixing section ending at the downstream second end wall, wherein the first mixing section is between the upstream end feed section and the second downstream end mixing section,
      at least a pair of horizontally oriented intermeshing self-wiping impellers traversing from an upstream end of the elongated mixing chamber to a downstream end of the elongated mixing chamber and rotating within the elongated mixing chamber,
   wherein each horizontally mounted impeller within the upstream end feed section of the elongated mixing chamber comprises an auger, wherein the dry cementitious powder is fed into the upstream end feed section of the elongated mixing chamber and conveyed by the auger to the first mixing section,
   feeding a liquid stream comprising water into the elongated mixing chamber of the continuous slurry mixer through at least one liquid stream inlet port downstream of the at least one dry cementitious powder inlet port and mixing the dry cementitious powder and the liquid stream in the first mixing section to form a cementitious slurry;
   wherein each horizontally mounted impeller within the first mixing section comprises a first plurality of mixing paddles mounted on a horizontally oriented shaft of the impeller at regular intervals and different circumferential locations, the paddles rotated about the horizontally oriented shaft within the horizontal housing, the paddles extending radially from the shaft, feeding a stream of reinforcement fibers through at least one reinforcement fiber inlet port into the second mixing section, and mixing the cementitious slurry and the reinforcement fibers in the second mixing section to form a fiber-slurry mixture, wherein at least a portion of each horizontally mounted impeller within the second mixing section of the elongated mixing chamber comprises a second plurality of mixing paddles mounted on the horizontally oriented shaft of the fiber-slurry mixer at regular intervals and different circumferential locations, the mixing paddles rotated about each respective horizontally oriented shaft within the horizontal housing, the mixing paddles extending radially from the respective shaft, wherein paddles on both shafts are used in a first portion of the second mixing section, wherein the second mixing section extends to the downstream end of the horizontal housing, wherein the second mixing section has an absence of an auger, wherein only paddles extend from the shafts in the second mixing section;

discharging the fiber-slurry mixture directly from the second downstream ends mixing section of the fiber-slurry mixer through an opening of the mixing chamber into and through a fiber-slurry mixture outlet port on the mixing chamber at a downstream end portion of the second mixing section, laterally relative to the horizontal housing through an opening in the side wall of the horizontal housing into and through the fiber-slurry mixture outlet port on the horizontal housing, wherein the cementitious slurry and fibers are mixed in the elongated mixing chamber of the horizontal continuous fiber-slurry mixer for an average mixing residence time of about 5 to about 240 seconds while the rotating mixing paddles apply shear force, wherein each said horizontally oriented shaft rotates at 30 to 450 RPM during mixing, to produce a uniform fiber-slurry mixture.

2. The method of claim 1, wherein the mixing chamber provides an average slurry residence time of 10 to about 60 seconds.

3. The method of claim 1, wherein the central rotating shaft rotates at 50 to 250 RPM during mixing.

4. The method of claim 1, wherein the fiber-slurry mixtures discharged from the fiber-slurry mixer have the viscosity of less than 10000 centipoise.

5. The method of claim 1, wherein the mixing paddles of the first and/or second mixing sections are selected from the group consisting of flat mixing paddles and helical mixing paddles, wherein the flat mixing paddles and helical mixing paddles are unitary paddles having a central opening fitted to the shaft such that the paddle encircles a portion of the shaft, wherein the flat mixing paddles and helical mixing paddles have opposed ends extending in opposite directions from the shaft, wherein the flat mixing paddles or helical mixing paddles are employed in the second mixing section in a paddle portion of the second mixing section.

6. The method of claim 1,
wherein the mixing paddles on both shafts are used in the first mixing section,
wherein mixing paddles on both shafts are used in a first portion of the second mixing section followed by mixing paddles mounted on both shafts in a second portion of the second mixing section at the downstream end portion of the second mixing section,
wherein the second portion of the second mixing section mixes the cementitious slurry and the reinforcement fibers,
wherein the mixing paddles of the second portion of the second mixing section are selected from the group consisting of
helical mixing paddles,
flat mixing paddles,
paddles made of a pin having opposed e3nds, one end for attaching to the shaft and the other end for attachment to a broad paddle head, and
the pins used without the paddle head,
wherein the flat paddles and helical paddles are unitary paddles having a central opening fitted to the shaft such that the paddle encircles a portion of the shaft, wherein the flat paddles and helical paddles have opposed ends extending in opposite radial directions from the shaft.

7. The method of claim 1, wherein the paddles mounted on the individual shafts are in over-lapping but non-interfering orientation when the mixer shafts are in rotational mode during the mixer operation.

8. The method of claim 6, wherein the helical or flat paddles are mounted on both shafts in the second portion of in the second mixing section.

9. The method of claim 6, wherein the helical paddles mounted on both shafts are used in the second portion of the second mixing section, wherein some of the helical paddles are reversed.

10. The method of claim 6, wherein flat and/or helical paddles are on the shaft in the second mixing section and all adjacent flat and/or helical paddles on the shaft in the second mixing section have a degree rotation with respect to each other of 0 to 90 degree.

11. The method of claim 1, wherein the mixing paddles of the first and/or second mixing sections are selected from the group consisting of flat mixing paddles and helical mixing paddles, wherein the flat mixing paddles and helical mixing paddles are unitary paddles having a central opening fitted to the shaft such that the paddle encircles a portion of the shaft, wherein the flat mixing paddles and helical mixing paddles have opposed ends extending in opposite directions from the shaft.

12. The method of claim 6, wherein flat and/or helical paddles are on the shaft in the second mixing section and the number of flat and/or helical paddles in the second mixing section is between 1 and 10.

13. The method of claim 6, wherein at least some of the paddles in at least one member of the group consisting of the first section and the second section comprise pins without heads.

14. The method of claim 6, wherein paddles in the first mixing section are flat or helical and paddles in the second mixing section comprise paddles with a pin and a head and/or paddles with pins.

15. The method of claim 1, wherein the paddle of the first and/or second mixing sections comprise a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged to mix the reinforcement fibers and cementitious slurry and move the cementitious slurry and reinforcement fibers being mixed to the fiber-slurry mixture outlet, wherein the paddles of the first and second mixing section each comprise the pin engaged to the paddle head and the second mixing section has an absence of an auger.

16. The method of claim 1, wherein the paddle of the first and/or second mixing sections comprise a pin engaged to a paddle head, the pin pivotally engaged to the horizontally oriented shaft and/or the paddle head to permit pivotal rotation of the paddle head relative to the respective location on the horizontally oriented shaft, wherein the plurality of paddles are arranged to mix the reinforcement fibers and cementitious slurry and move the cementitious slurry and reinforcement fibers being mixed to the fiber-slurry mixture outlet, wherein the paddles of the first and second mixing section each comprise the pin engaged to the paddle head and the second mixing section has an absence of an auger, wherein orientation of the paddle head having a broad surface with respect to the central shaft vertical cross-section is preferably from about 10° to 80°.

17. The method of claim 1, wherein the overall dimensions of the paddles are such that the clearance (space) between the inner circumference of the mixer chamber and the paddle's furthermost point from the central shaft is less than ¼".

18. The method of claim 1, wherein the cementitious slurry and fibers are mixed in the mixing chamber of the fiber-slurry mixer to produce the uniform fiber-slurry mixture that has consistency that will allow the fiber-slurry mixture to be discharged from the fiber-slurry mixer and be suitable for being deposited from a headbox as a continuous curtain on a moving surface of a panel production line uniformly as a layer 0.4 to 1.25 inches thick on the moving surface of the panel production line to produce a fiber reinforced concrete panel, further comprising passing the discharged slurry into the headbox, depositing the slurry from the headbox onto the continuous moving surface, and vibrating the deposited slurry with a vibrating plate to assist in leveling the fiber-slurry mixture, the vibrating plate is provided under or slightly downstream of the location where the headbox deposits the fiber-slurry mixture.

19. The method of claim 1, wherein the paddles and the horizontal housing interior side wall are coated with a release material, to minimize buildup of the cementitious slurry on the paddles.

20. The method of claim 1, wherein the mixing chamber of the fiber-slurry mixer adapted and configure to mix the cementitious slurry and fibers in the mixing chamber of the fiber-slurry mixer for an average mixing residence time of about 10 to about 120 seconds, while the rotating paddles apply shear force to the fiber-slurry and length of the mixing chamber ranges from 3 to 8 feet, and diameter of the mixing chamber ranges from about 6 to 24 inches.

* * * * *